US005129062A

United States Patent [19]

Gygi et al.

[11] Patent Number: 5,129,062

[45] Date of Patent: Jul. 7, 1992

[54] VMEBUS-UCDP INTERFACE MODULE

[75] Inventors: Scott A. Gygi; Daniel J. Kurfis, both of Las Vegas, Nev.

[73] Assignee: Loral Aerospace Corp., New York, N.Y.

[21] Appl. No.: 488,210

[22] Filed: Mar. 1, 1990

[51] Int. Cl.[5] .................... G06F 13/42

[52] U.S. Cl. .................... 395/250; 395/725; 395/550

[58] Field of Search .................... 364/200, 900

[56] References Cited

U.S. PATENT DOCUMENTS

| | | | |
|---|---|---|---|
| 4,398,248 | 8/1983 | Hsia et al. | 364/200 |
| 4,748,573 | 5/1988 | Sarandrea et al. | 364/551.01 |
| 4,809,081 | 2/1989 | Linehan | 358/260 |
| 4,823,305 | 4/1989 | Holdren et al. | 364/900 |
| 4,879,716 | 11/1989 | McNally et al. | 371/8.2 |
| 4,942,550 | 7/1990 | Murray | 364/900 |
| 4,965,559 | 10/1990 | Dye | 340/717 |
| 5,003,461 | 3/1991 | Fritsche | 364/200 |

OTHER PUBLICATIONS

Image-Processing Module Works Like a VMEBUS CPU by: Craig D. Rose, p. 74 Electronics/Jun. 16, 1986.

Interface Control Document RFC-100 Version 2.0 Jul. 1989.

Interface Control Document ICD-102 15 Dec. 1989.

Motorola MC68153 Bus Interrupter Module (Product Preview).

*Primary Examiner*—Michael R. Fleming

*Assistant Examiner*—Ayaz R. Sheikh

*Attorney, Agent, or Firm*—Edward J. Radlo; Claude A. S. Hamrick; J. Eppa Hite, III

[57] ABSTRACT

An interface module for coupling a VMEbus channel to a Universal Common Data Point channel and exchanging data signals in either direction. The module responds to protocol handshake signals from the originating channel, accepts a multi-word message-block, and provides handshake signals to notify the destination channel of message to be delivered. The module then transfers the message-block to the destination channel.

7 Claims, 30 Drawing Sheets

| | | |
|---|---|---|
| C32 | 96 | GND |
| C31 | 95 | GND |
| C30 | 94 | GND |
| C29 | 93 | GND |
| C28 | 92 | GND |
| C27 | 91 | GND |
| C26 | 90 | GND |
| C25 | 89 | GND |
| C24 | 88 | GND |
| C23 | 87 | GND |
| C22 | 86 | GND |
| C21 | 85 | GND |
| C20 | 84 | OSTART/ |
| C19 | 83 | OBR |
| C18 | 82 | ODC/ |
| C17 | 81 | ODR/ |
| C16 | 80 | DOUT 15 |
| C15 | 79 | DOUT 14 |
| C14 | 78 | DOUT 13 |
| C13 | 77 | DOUT 12 |
| C12 | 76 | DOUT 11 |
| C11 | 75 | DOUT 10 |
| C10 | 74 | DOUT 9 |
| C9 | 73 | DOUT 8 |
| C8 | 72 | DOUT 7 |
| C7 | 71 | DOUT 6 |
| C6 | 70 | DOUT 5 |
| C5 | 69 | DOUT 4 |
| C4 | 68 | DOUT 3 |
| C3 | 67 | DOUT 2 |
| C2 | 66 | DOUT 1 |
| C1 | 65 | DOUT 0 |
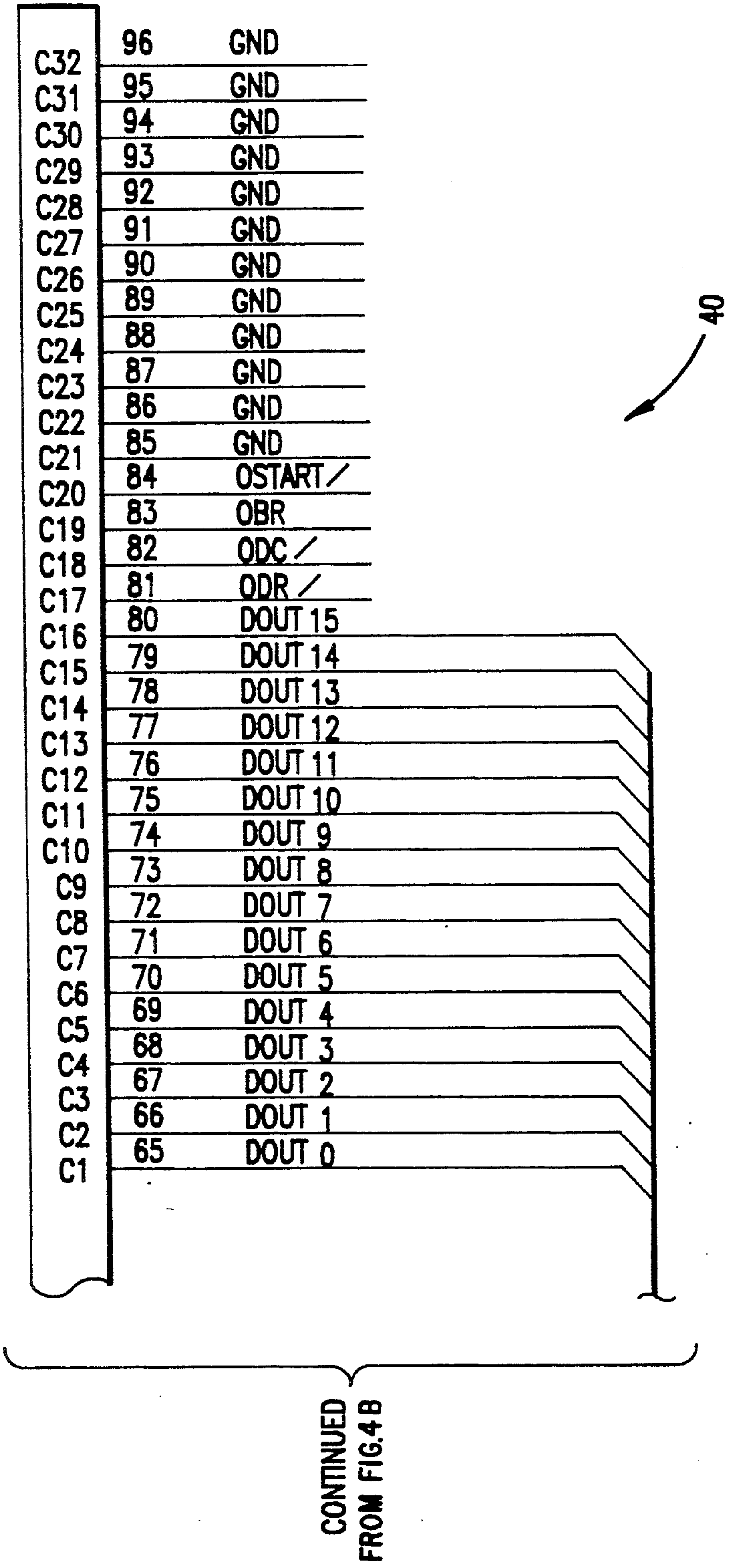
FIG.4C
CONTINUED FROM FIG.4B

| OFFSET | BIT 7 | 6 | 5 | 4 | 3 | 2 | 1 | 0 | SIZE | MODE |
|---|---|---|---|---|---|---|---|---|---|---|
| $ 00 | 64-BYTE INPUT BUFFER REGISTER | | | | | | | | B/W | R |
| $ 40 | 64-BYTE OUTPUT BUFFER REGISTER | | | | | | | | B/W | W |
| | INPUT DATA READY INTERRUPT CONTROL REGISTER | | | | | | | | B | R/W |
| $ 80 | F | FAC | X/IN* | IRE | IRAC | INTERRUPT LEVEL | | | | |
| | EXTERNAL START INTERRUPT CONTROL REGISTER (ISTART) | | | | | | | | B | R/W |
| $ 82 | F | FAC | X/IN* | IRE | IRAC | INTERRUPT LEVEL | | | | |
| | INPUT TRANSFER COMPLETE INTERRUPT CONTROL REGISTER | | | | | | | | B | R/W |
| $ 84 | F | FAC | X/IN* | IRE | IRAC | INTERRUPT LEVEL | | | | |
| | OUTPUT TRANSFER COMPLETE INTERRUPT CONTROL REGISTER | | | | | | | | B | R/W |
| $ 86 | F | FAC | X/IN* | IRE | IRAC | INTERRUPT LEVEL | | | | |
| $ 88 | INPUT DATA READY INTERRUPT VECTOR REGISTER | | | | | | | | B | R/W |
| $ 8A | EXTERNAL START INTERRUPT VECTOR REGISTER | | | | | | | | B | R/W |
| $ 8C | OUTPUT TRANSFER COMPLETE INTERRUPT VECTOR REGISTER | | | | | | | | B | R/W |
| $ 8E | INPUT TRANSFER COMPLETE INTERRUPT VECTOR REGISTER | | | | | | | | B | R/W |
| | CONTROL REGISTER U9 | | | | | | | | B | W |
| $ C0 | | OEN\ | IBR | RES4\ | | RES2\ | RES1\ | RES0\ | | |
| | STATUS REGISTER U3 | | | | | | | | B | R |
| $ C2 | | OBR | OTC | ODR | ISTART | OVRRN | ITC | IDR | | |
| | SIGNAL GENERATOR TIME CONSTANT REGISTERS | | | | | | | | W | W |
| $ C4 | PULSE WIDTH TIME CONSTANT (UPPER BYTE) U34 | | | | | | | | | |
| | PULSE PERIOD TIME CONSTANT (LOWER BYTE) U35 | | | | | | | | | |
| $ C6 | TRANSMIT ACTIVATION REGISTER (SEND\) | | | | | | | | B | W |
| $ C8 | EXTERNAL START GENERATION REGISTER (OSTART\) | | | | | | | | B | W |

FIG.6

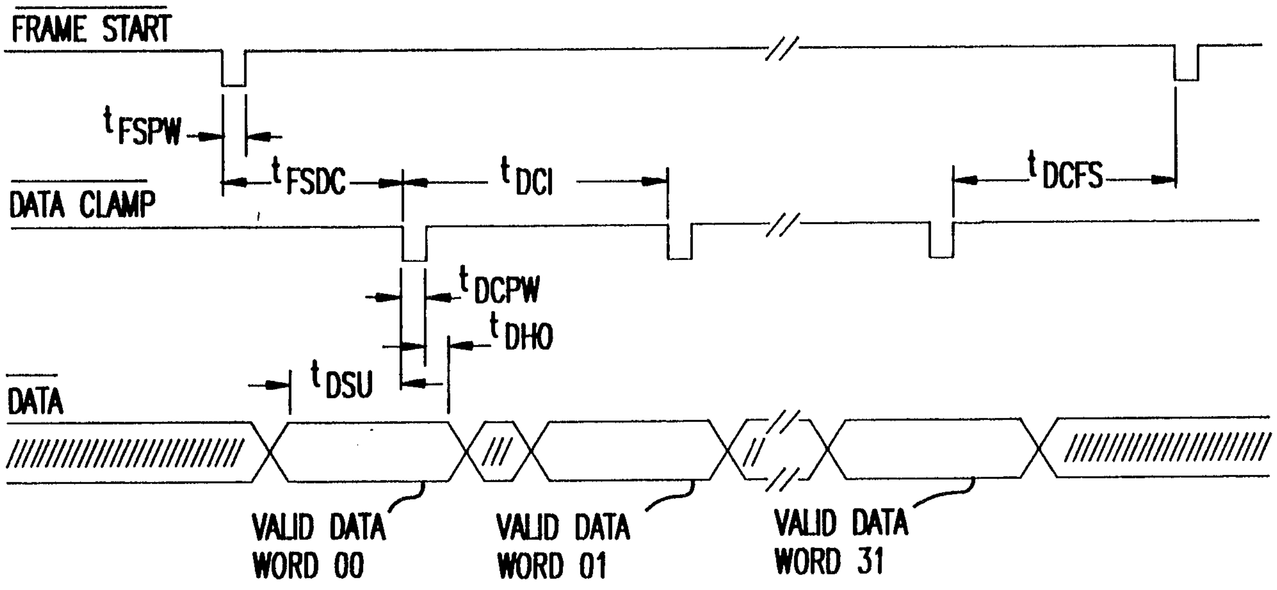

| SYMBOL | DEFINITION | VALUE (MIN) | UNITS |
|---|---|---|---|
| $t_{FSPW}$ | FRAME START PULSE WIDTH | 5.0+/−0.5 | USEC |
| $t_{DCPW}$ | DATA CLAMP PULSE WIDTH | 5.0+/−0.5 | USEC |
| $t_{FSDC}$ | FRAME START TO DATA CLAMP (LEADING EDGE TO LEADING EDGE) | 15.0+/−0.5 | USEC |
| $t_{DCFS}$ | DATA CLAMP TO FRAME START (TRAILING EDGE TO LEADING EDGE) | 15.0+/−0.5 | USEC |
| $t_{DSU}$ | DATA SETUP (VALID DATA TO LEADING EDGE OF DATA CLAMP) | 5.0+/−0.5 | USEC |
| $t_{DHO}$ | DATA HOLD OFF (TRAILING EDGE OF DATA CLAMP TO DATA NOT VALID) | 0.0 | USEC |
| $t_{DCI}$ | DATA CLAMP INTERVAL (LEADING EDGE TO LEADING EDGE) | 15.0+/−0.5 | USEC |

FIG.10

VMEBUS-UCDP INTERFACE MODULE

BACKGROUND OF THE INVENTION

1. Field of the Invention

The present invention relates generally to digital signal communications, and more specifically to VMEbus interfaces to military range systems.

2. Discussion of the Prior Art

Since being introduced in the early 1980's, "Versa Module Eurocard" VMEbus systems have been increasingly widely used because their functions are adaptable to various configurations.

In military applications, electronic threat range systems of different types cooperate through interfaces of various types. Two of these are the "Common Digital Data Interface" (CDDI) and the "Universal Common Data Point" (UCDP) interface, both of which similarly use separate input and output channels and transfer data as 16-bit words in 32-word message blocks. CDDI standards are specified in U.S. Air Force interface control document RFC-100 version 2.0, and UCDP standards are specified in interface control document ICD-102, both of which are incorporated herein by reference. The present application uses "UCDP" to refer also to CDDI interfaces.

VMEbus functions are useful for their adaptability to applications in military range systems, but there has not previously been available an interface means for providing the necessary protocol handshake signals for VMEbuses to be connected to such range systems. Example prior art VMEbus interfaces are the MVME340A module by Motorola, a Navy Tactical Data Systems (NTDS) interface by Rockwell, and the Small Computer Systems Interface (SCSI).

SUMMARY OF THE INVENTION

The present invention provides an interface module appropriate for connecting electronic range systems to VMEbus computers. The invention facilitates transfers both to and from range systems and VMEbuses for data processing and control by powerful computers.

The properties which make this module unique involve data buffering capacity and autonomous timing generation. Although a circuit like the MVME340A may be made to function similarly to . the invention, the MVME340A can handle only one 16-bit word at a time. A VME processor must be involved with each individual word transaction, keeping the processor from doing anything else for (typically) 640 usec per message. The invention stores the entire message in local memory before interrupting the VME processor. A block read or write from the interface memory can typically be performed in less than 60 usec, a savings of nearly 600 usec.

Another feature of the invention is the ability to be programmed to synthesize its own transaction timing-/control signals so that the local VME processor never has to be concerned with generation of Data Ready or Data Clamp pulses, (except one time, when first initialized). Cards like the MVME340A, while capable of generating data ready and data clamp signals, must do so under direct control of the VME processor. These cards require the VME processor to first write a one (or zero) to the line being driven, then wait the duration of the pulse width, then write a zero (one) to that same line. It is this direct control which forces the VME processor to perform nothing but this transaction for the entire 640 Msec, a limitation not found in the invention. Also a drawback to these other cards, the resolution of the timing signals is directly tied to the speed of the VME processor, meaning that a resolution of about 1 usec will be the best that could be attained.

BRIEF DESCRIPTION OF THE DRAWING

FIG. 4A-4G show UCDP-to-P2 connector pin assignments;

FIG. 6 is a map of register addresses in the interface module;

FIG. 10 is a graph showing data clamp DC and data D[.] timing waveforms for a CDDI signal transfer;

DETAILED DESCRIPTION OF THE INVENTION

Figure 1:
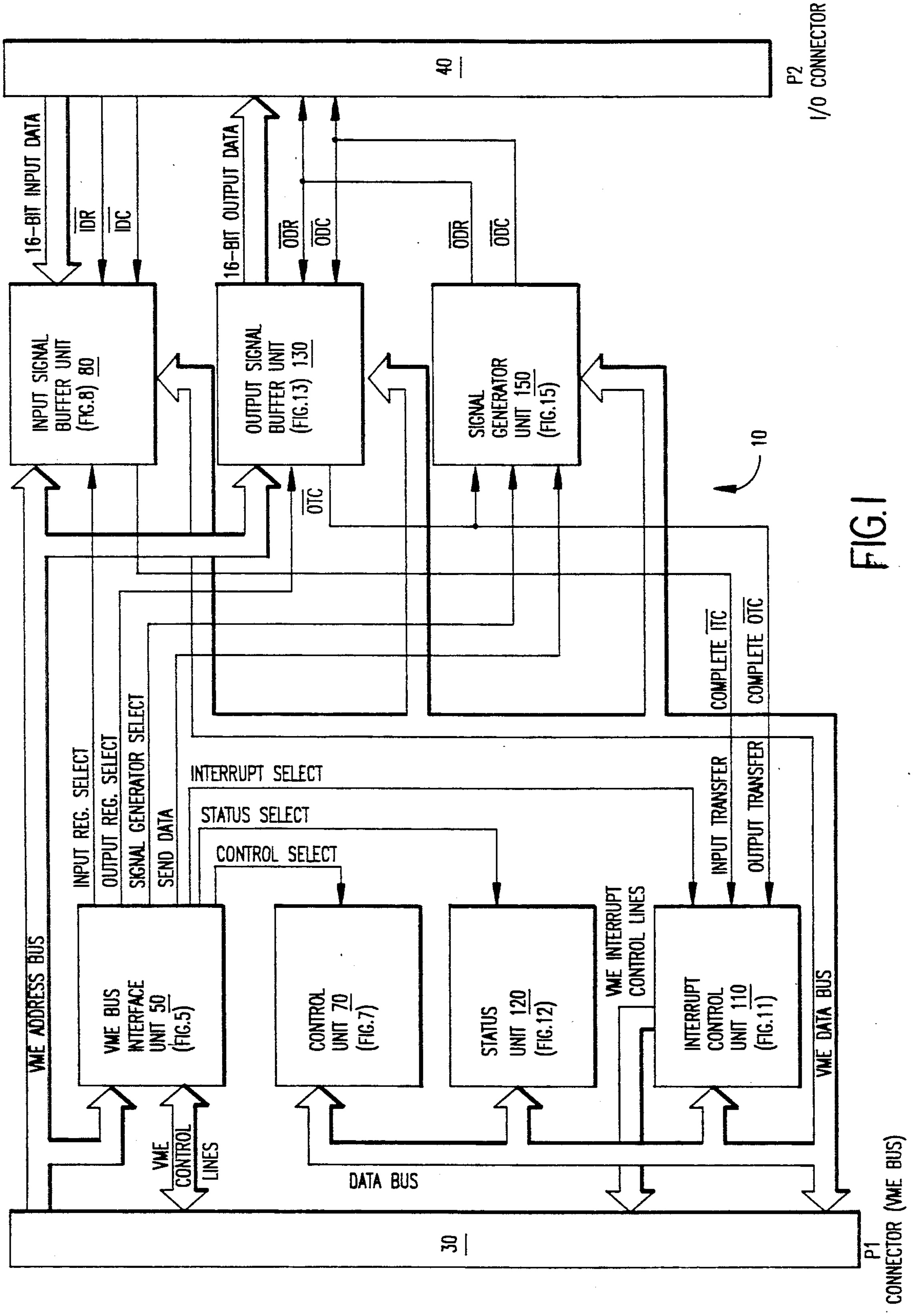
FIG. 1 is a schematic diagram of functional units and interconnecting signal paths in an interface according to a preferred embodiment of the invention.

FIG. 1 is a schematic illustration of an interface module according to the present invention for connecting a VMEbus to a UCDP.

Figure 2A:
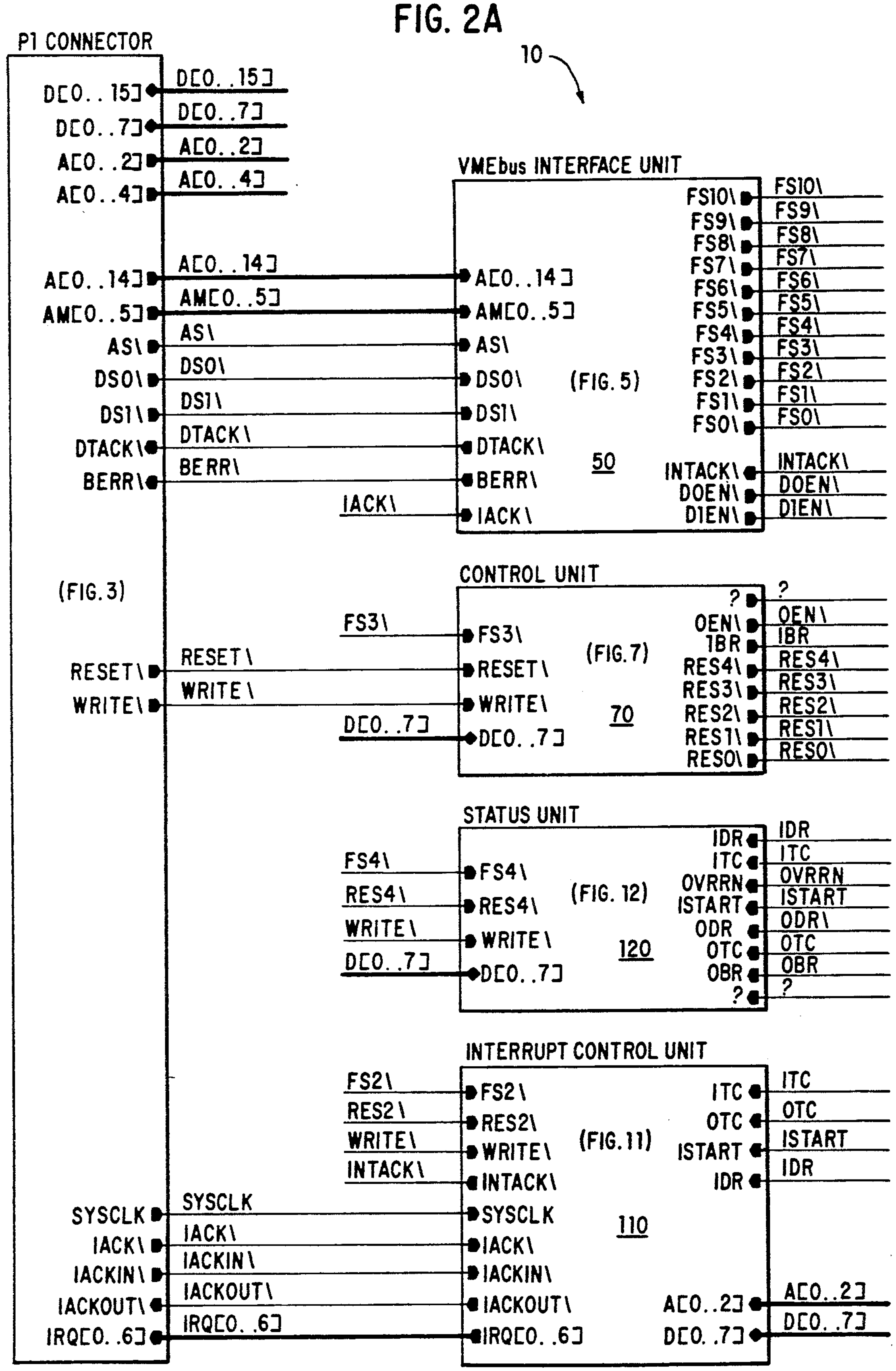
FIG. 2A and 2B show a module card layout of functional units generally including multiple integrated circuit devices in the embodiment of FIG. 1.
Figure 2B:
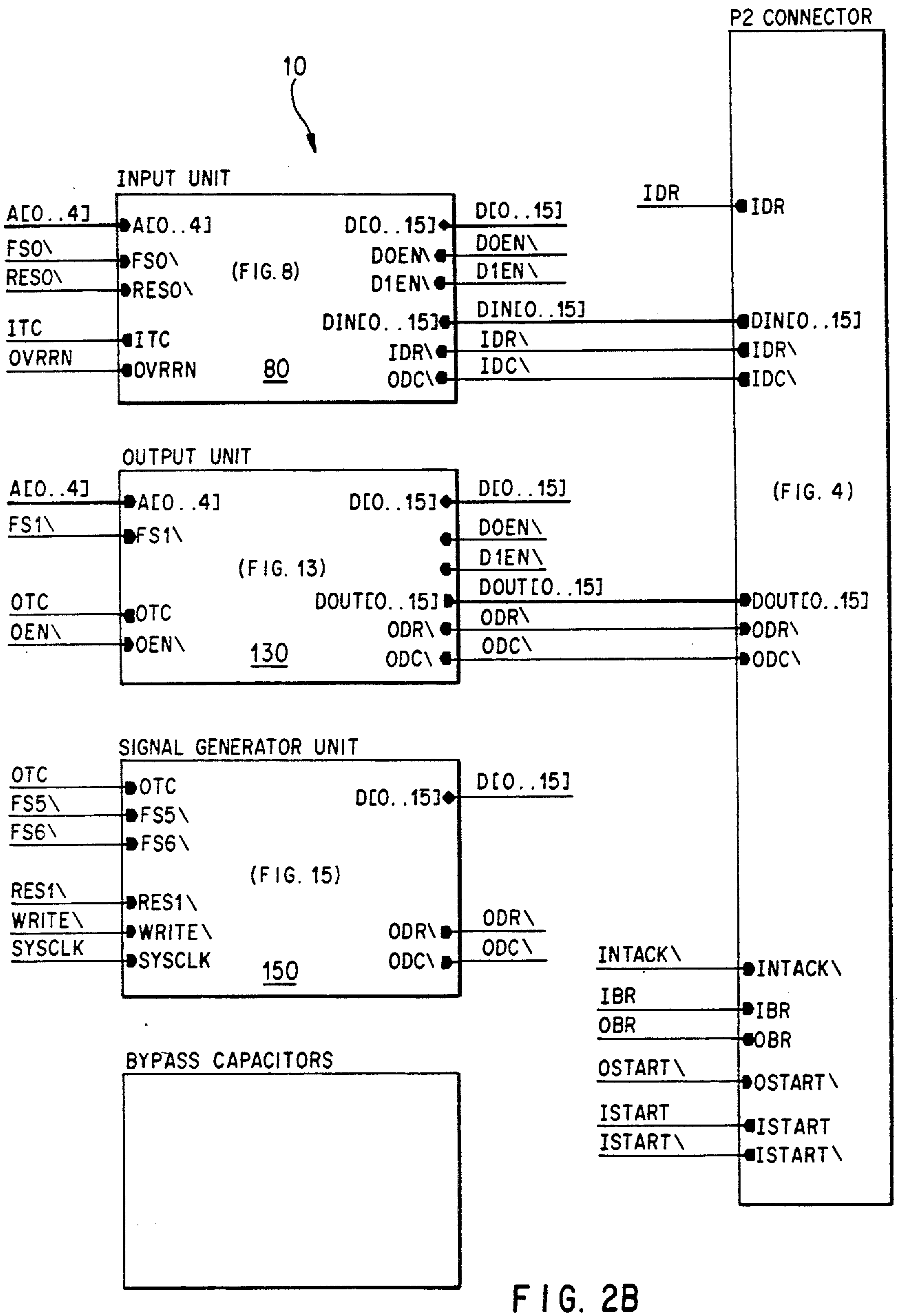

FIG. 2 shows the interface module 10 in which component units are arranged between a Pl connector 30 plugging directly into the backplane of a VMEbus (not shown) and a P2 connector 40 to an external UCDP (not shown).

Figure 3A:
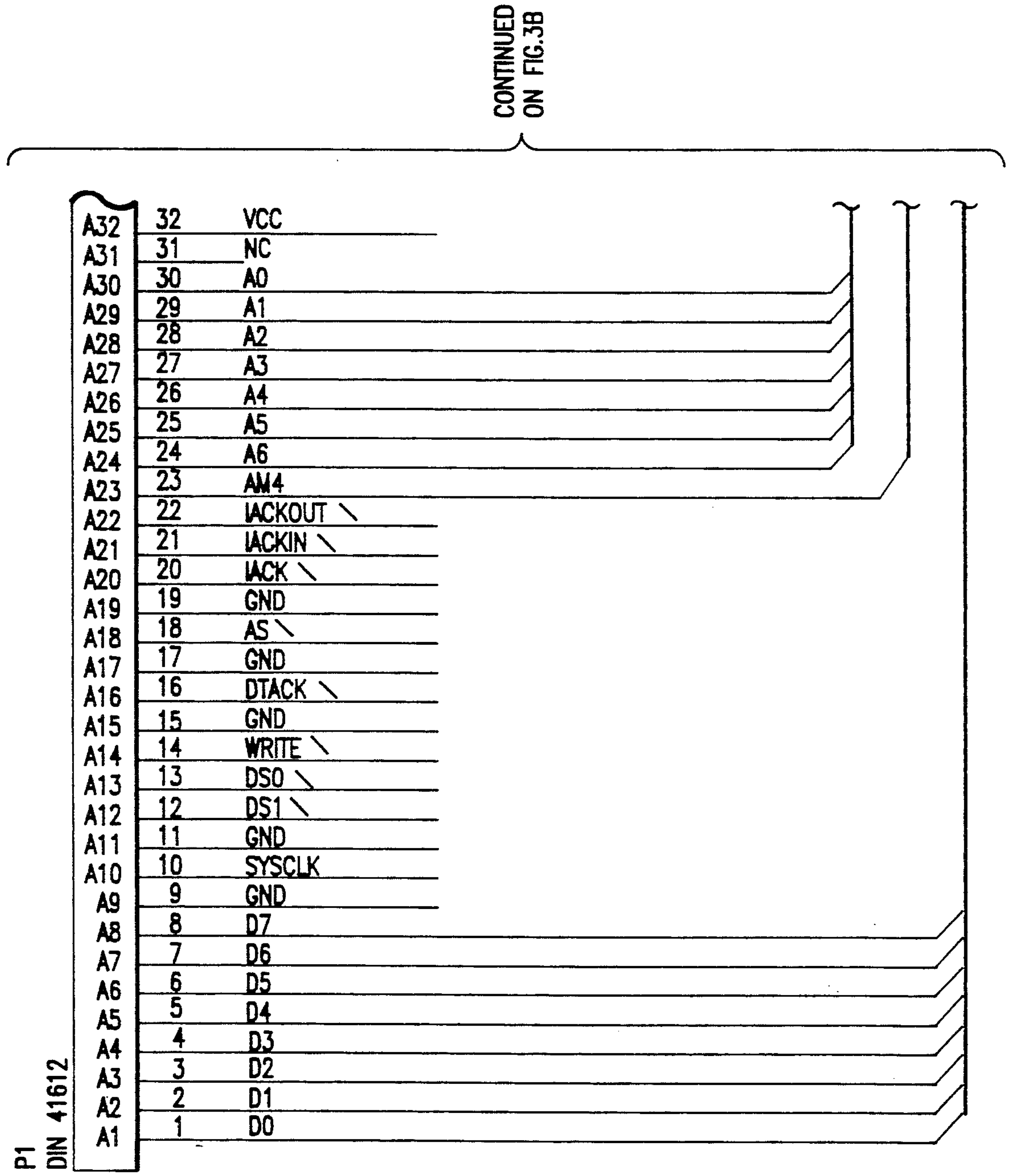
FIG. 3A-3C shows VMEbus-to-P1 connector pin assignments in the module.
Figure 3B:
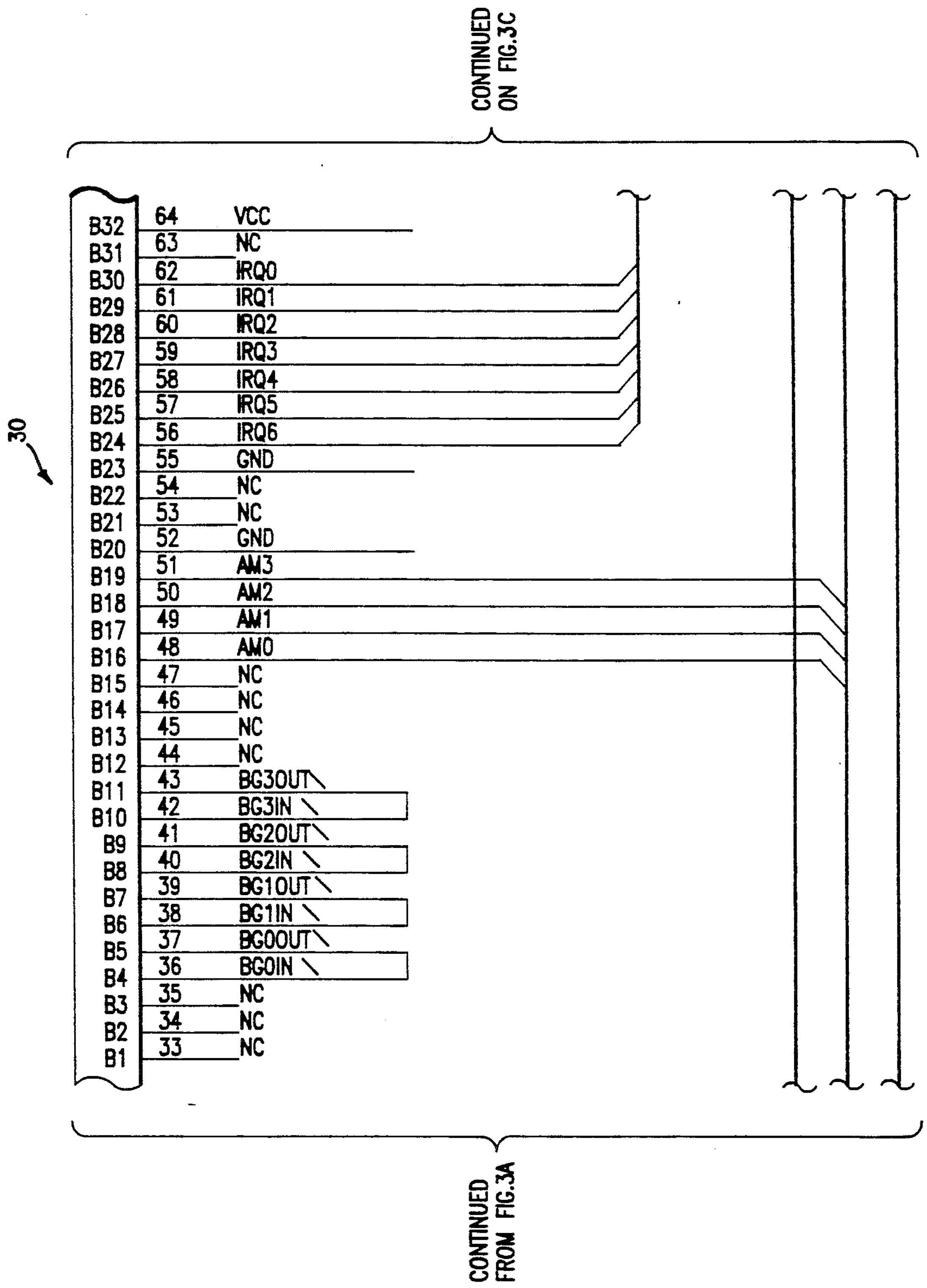
Figure 3C:
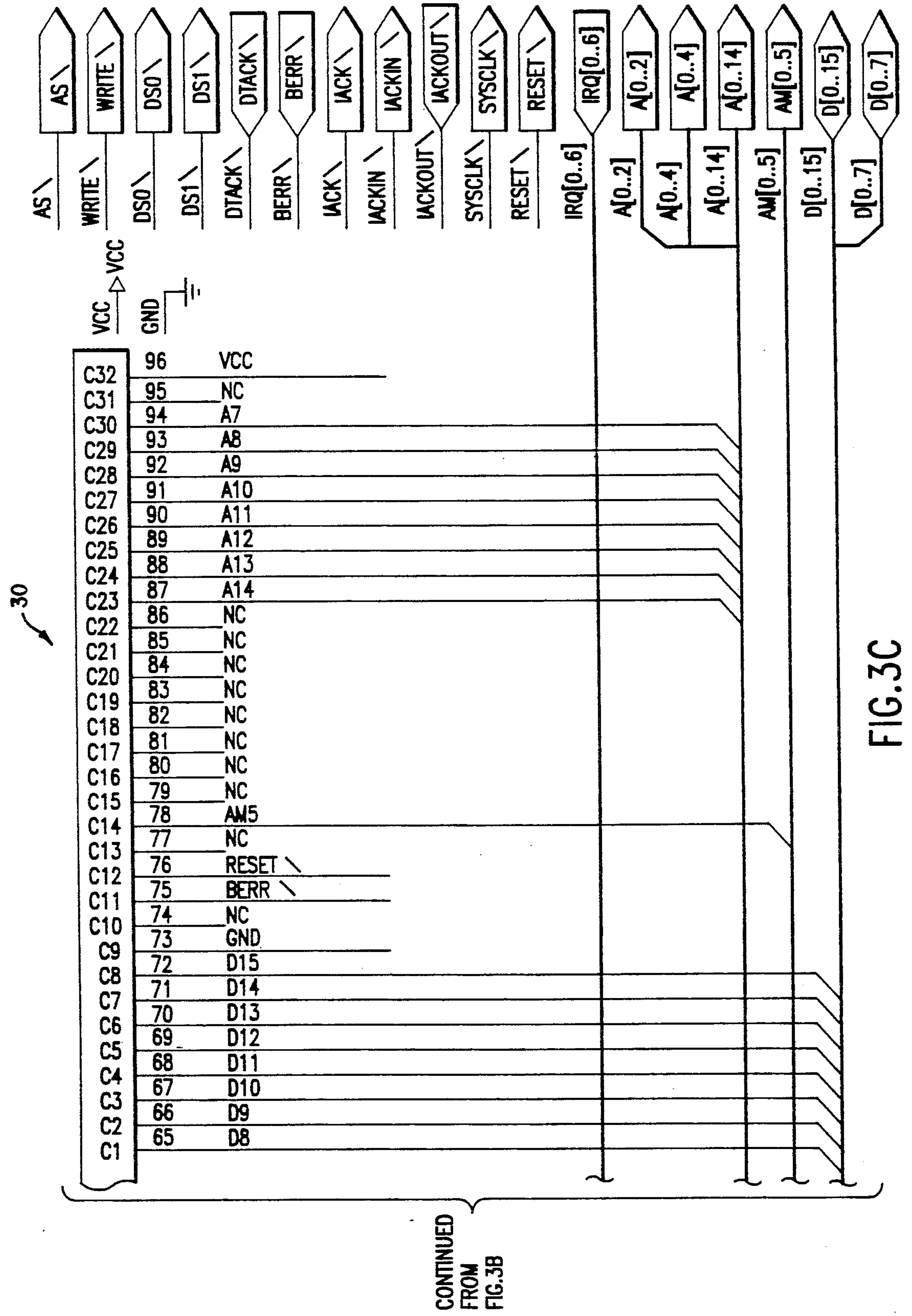

FIG. 3 shows Pl connector 30 pin assignments for the required data lines D[0..15], address lines A[0 . .14], address-modifier lines AM[0..5], address strobe line AS, upper and lower byte data strobe lines DS0 and DSl, data transfer acknowledge line DTACK, bus error line BERR, reset line RESET, read-write line WRITE, clock line SYSCLK, and interrupt lines IACK, IACKIN, IACKOUT and IRQ[0..6].

Figure 4A:
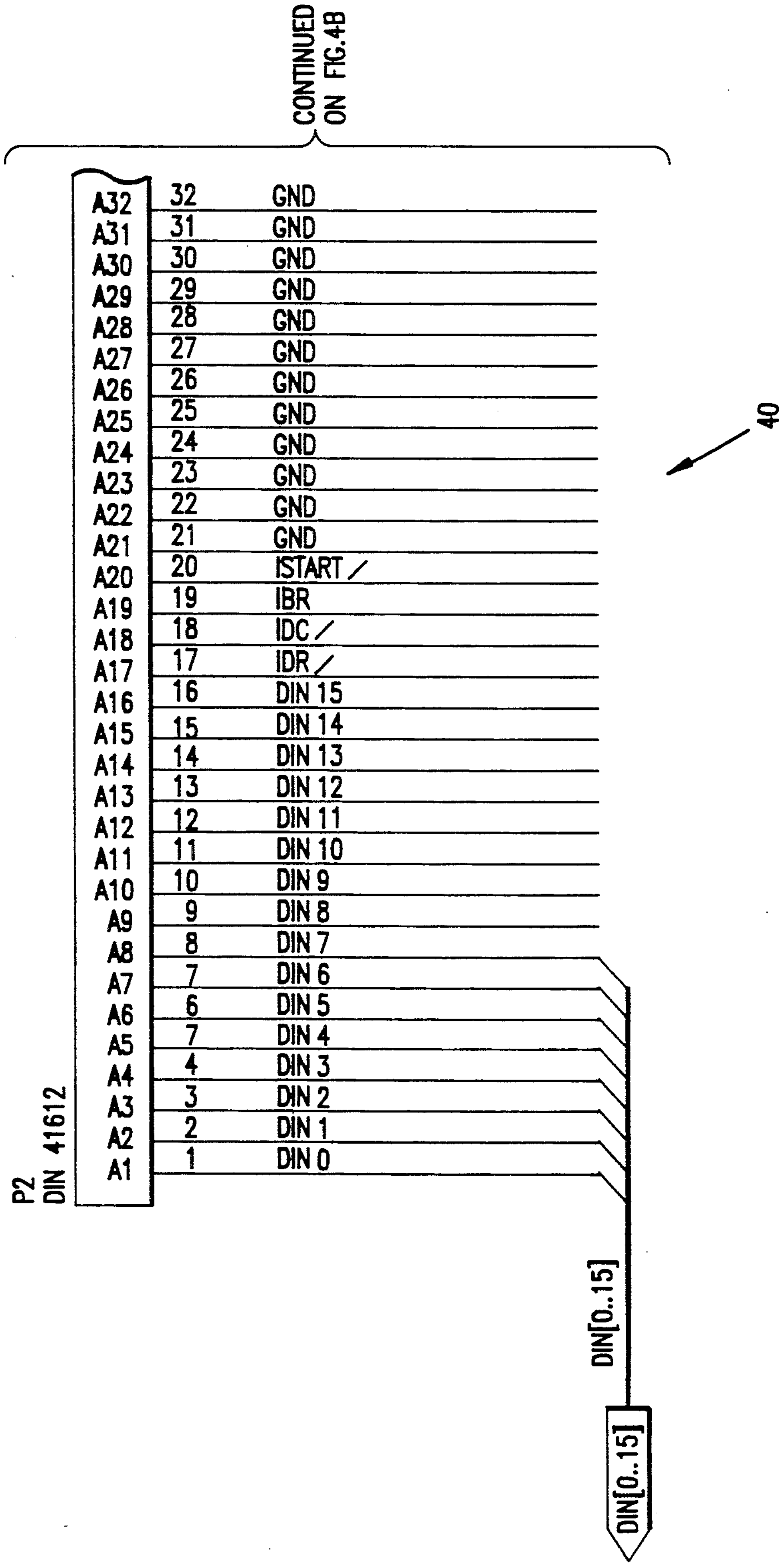
Figure 4B:
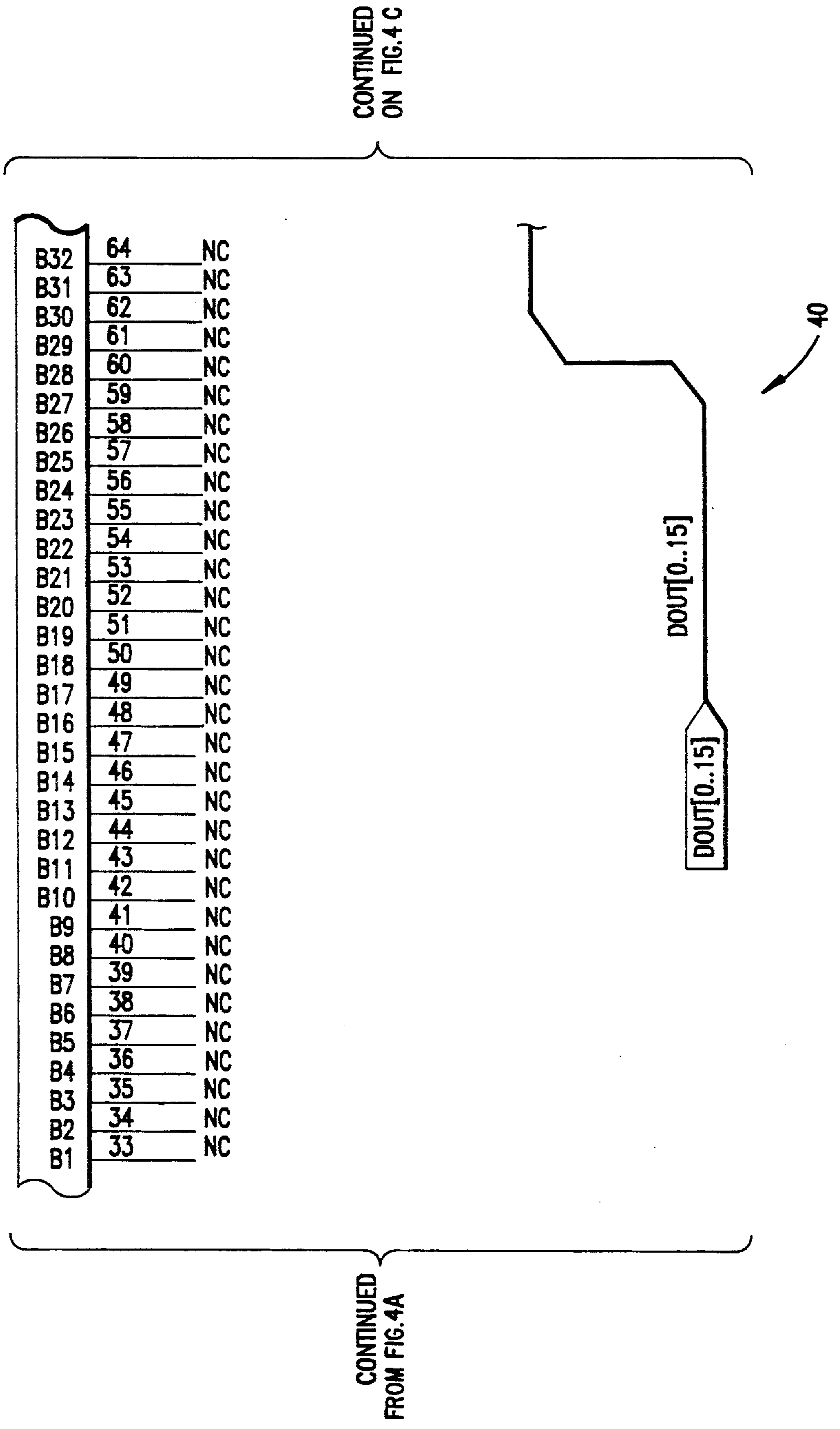
Figures 4D, 4E, 4F, 4G:
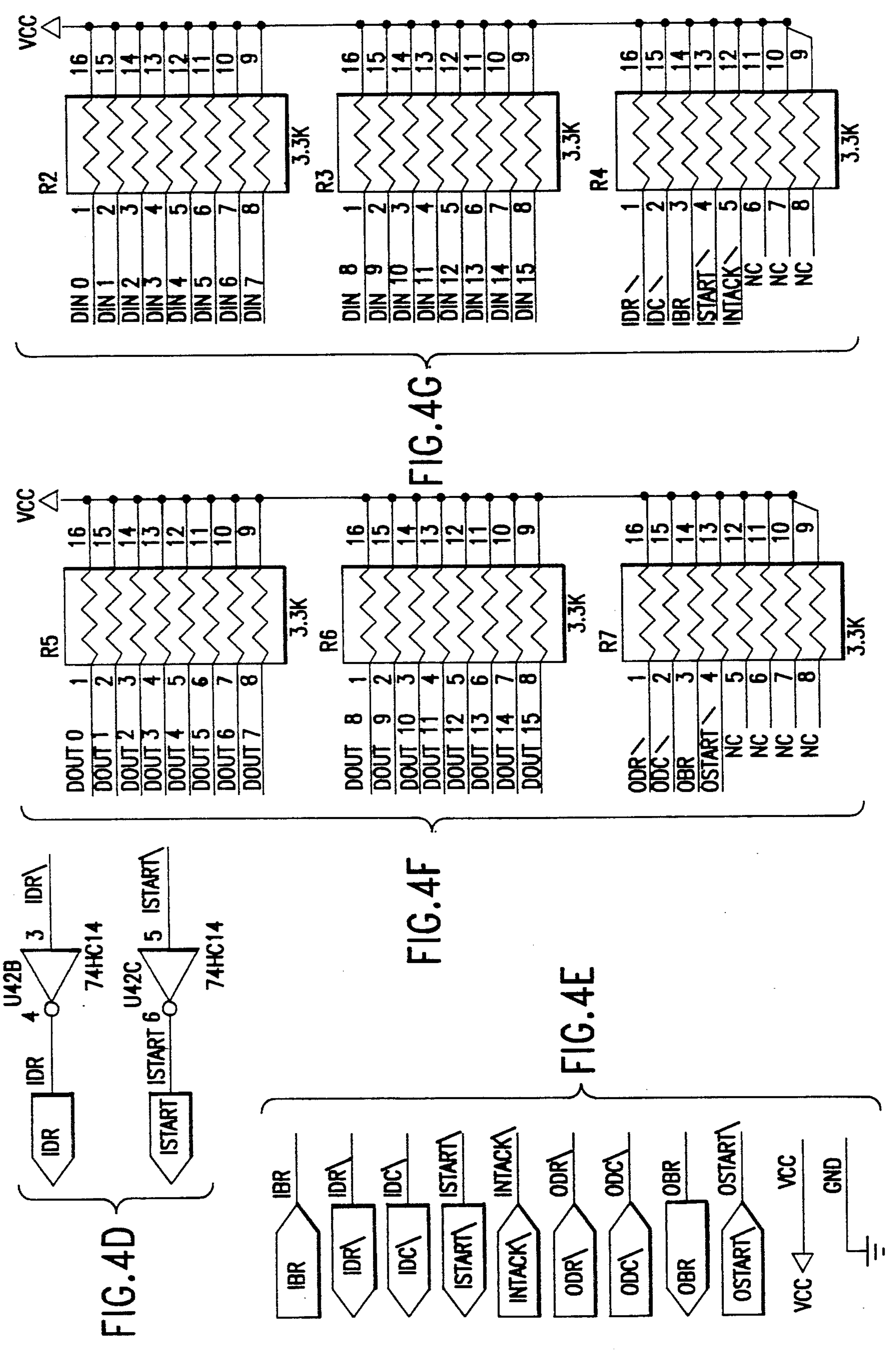

FIG. 4 shows P2 connector 40 pin assignments for the lines required to exchange signals with an external UCDP. The "A" (left) row of pins receives inputs from an external UCDP. The "B" (middle) row of pins is not used. The "C" (right) row of pins transmits outputs to the UCDP. The A row of input pins corresponds one-for-one to the B row of output pins, so the interface is effectively transparent to the UCDP.

During any time while the P2 connector may happen to be disconnected from an external UCDP, all of the P2 pins have TTL logic signal high values provided by associated 3.3 K ohm pull-up resistor packs R2, R3, R4, R5 and R6.

Connectors Pl and P2 are each 96-pin male DIN 41612 connectors in the family of 603-2-IEC-xxxxxx-xxx connectors described in IEC publication 603-2. The invention in an CDDI embodiment uses comparable 55-pin J1 and J2 connectors in the D3899/XXWE35N family referred to by document RFC-100.

Figure 5A:
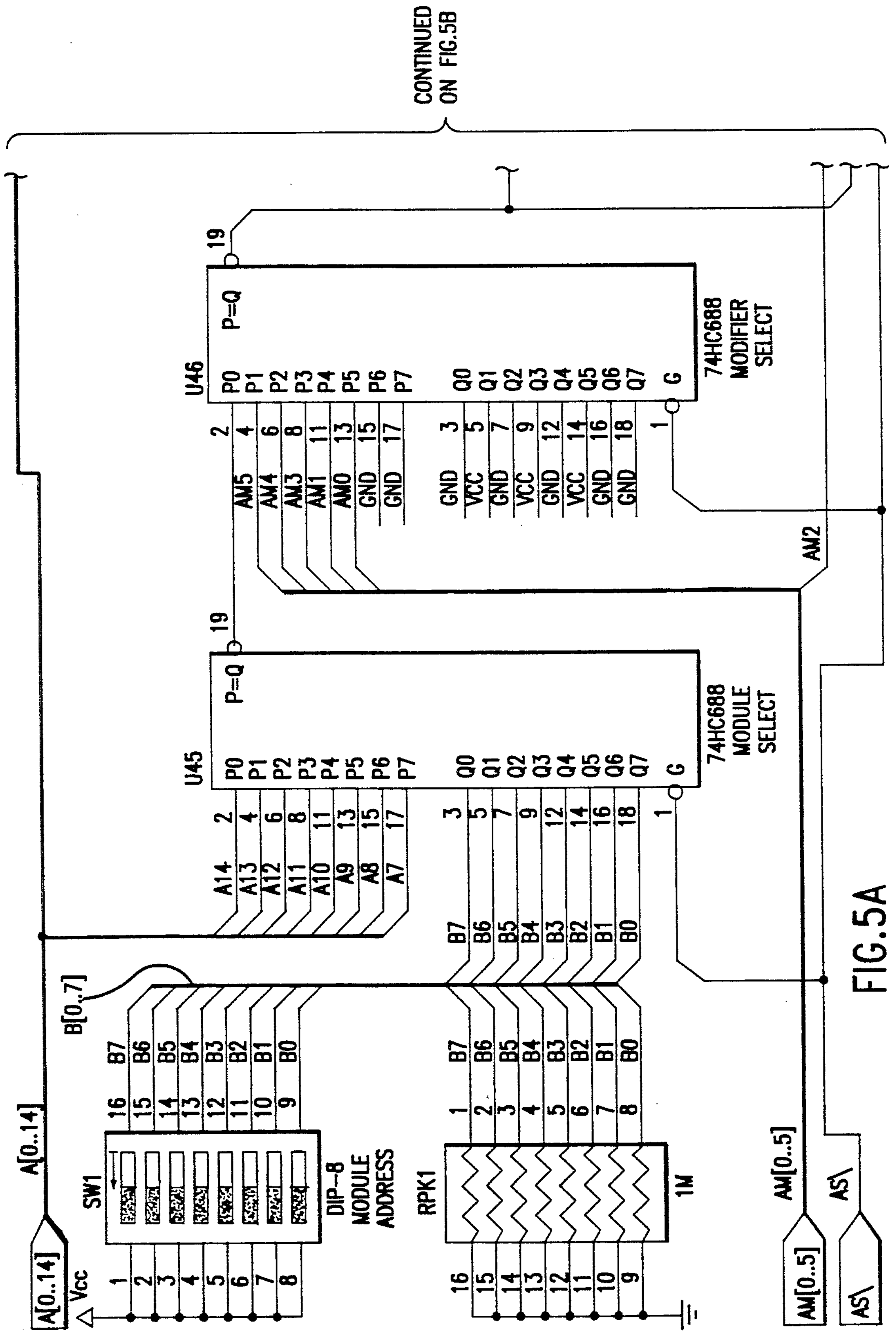
FIG. 5A-5B show elements of the VMEbus interface unit of FIG. 2.
Figure 5B:
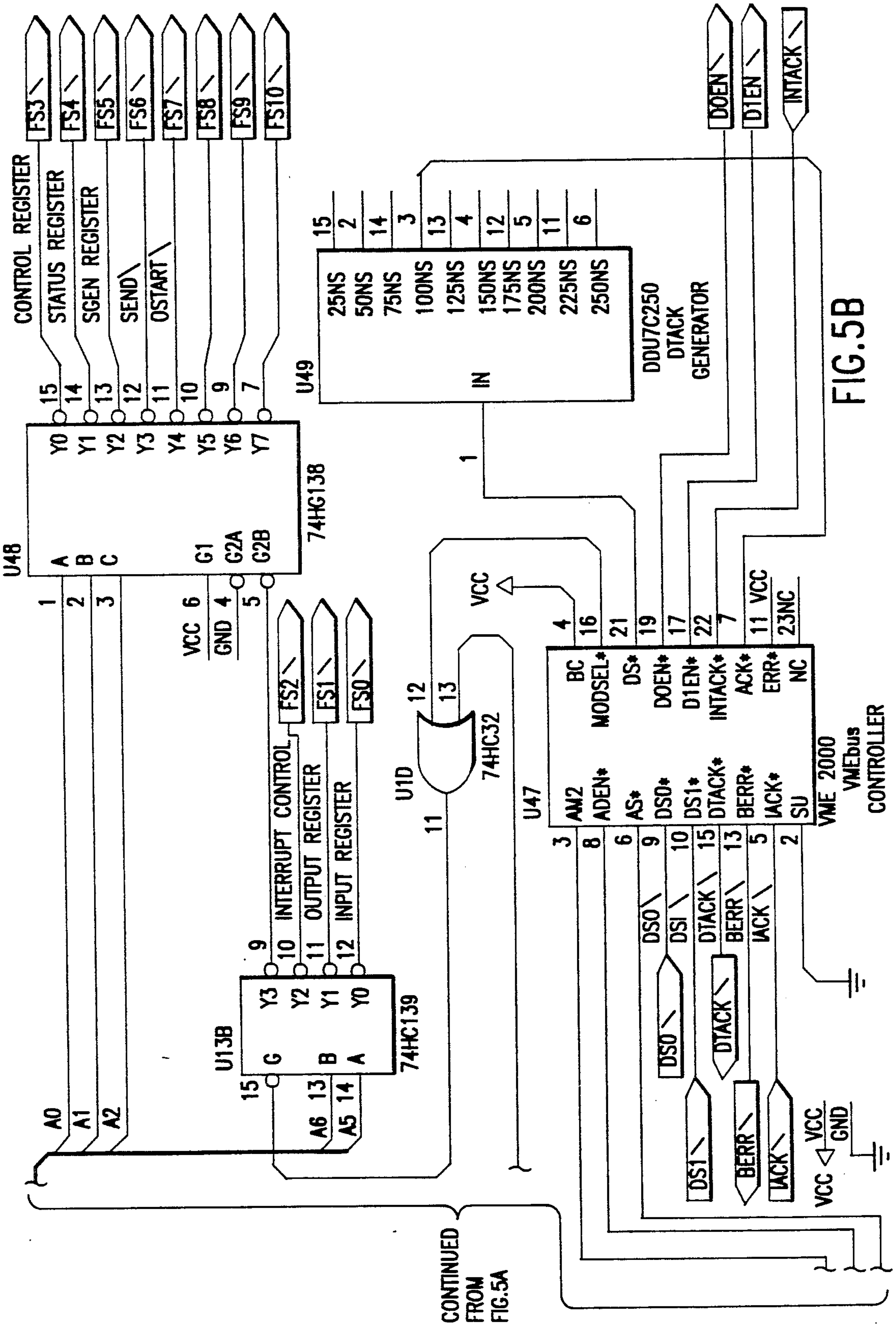

FIG. 5 shows the preferred VMEbus interface unit 50, which enables the VMEbus to conduct transactions to and from interface module registers occupying 256 bytes, as shown in the FIG. 6 register model, between boundaries at whole-multiples of 256 bytes in the range of short (0000 to FFFF HEX) addresses of the VMEbus. The VMEbus computer accesses a base address which is programmable by a DIP-8 switch SW1 in interface unit 50.

Module selector U45 and modifier selector U46 are 8-bit comparators (standard part #74HC688) which decode VMEbus address bits A[7 . .14] and address-modifier bits AM[0,1,3 . .5] respectively. When addressed on falling edges of address strobe signals AS, comparators U45 and U46 generate address-enable signals to the ADEN* input of interface cortroller U47.

Interface controller U47 is preferably a Motorola VME2000 controller which, in response to falling edges of input data strobe signals DS0 and DSl, outputs from pin DS* a falling edge data strobe signal to DTACK generator U49 (SP# DDU7C250) which, after a delay of 100 nanoseconds (long enough to invoke any function of the interface module), outputs a trigger signal back to the ACK* input of controller U47. In turn, controller U47 toggles the DTACK* output data transfer acknowledge signal on line DTACK indicating a bus transfer complete to the VMEbus computer.

An address-enable signal input ADEN* also causes controller U47 output pin MODSEL* to lower the module select signal input to OR gate U1D (SP# 74HC32). Then, depending upon VMEbus address signal A[5,6] inputs to 1-of-4 decoder U13B (SP# 74HC139) and signal A[0 . .2] inputs, 3-of-8 decoder U48 (SP# 74HC138) activates one of output lines FS0 through FS7 to enable other units of the interface module.

A transmit activation register at base address offset C6 (HEX) activates line FS6 with a SEND signal to begin a stored message transmission from the output buffer to an external UCDP. No data transfer between the local VME processor and the module takes place when accessing this register, which responds to address C6 (HEX) whether read from or written to.

An external start generation register at base address offset C8 (HEX) generates a single two-millisecond wide pulse OSTART on line FS7 to request an external UCDP to begin a transfer into this UCDP. There is no transfer of data between the local VME processor and the interface module when accessing this register, which responds to being addressed whether read from or written to.

Figures 7A, 7B, 7C:
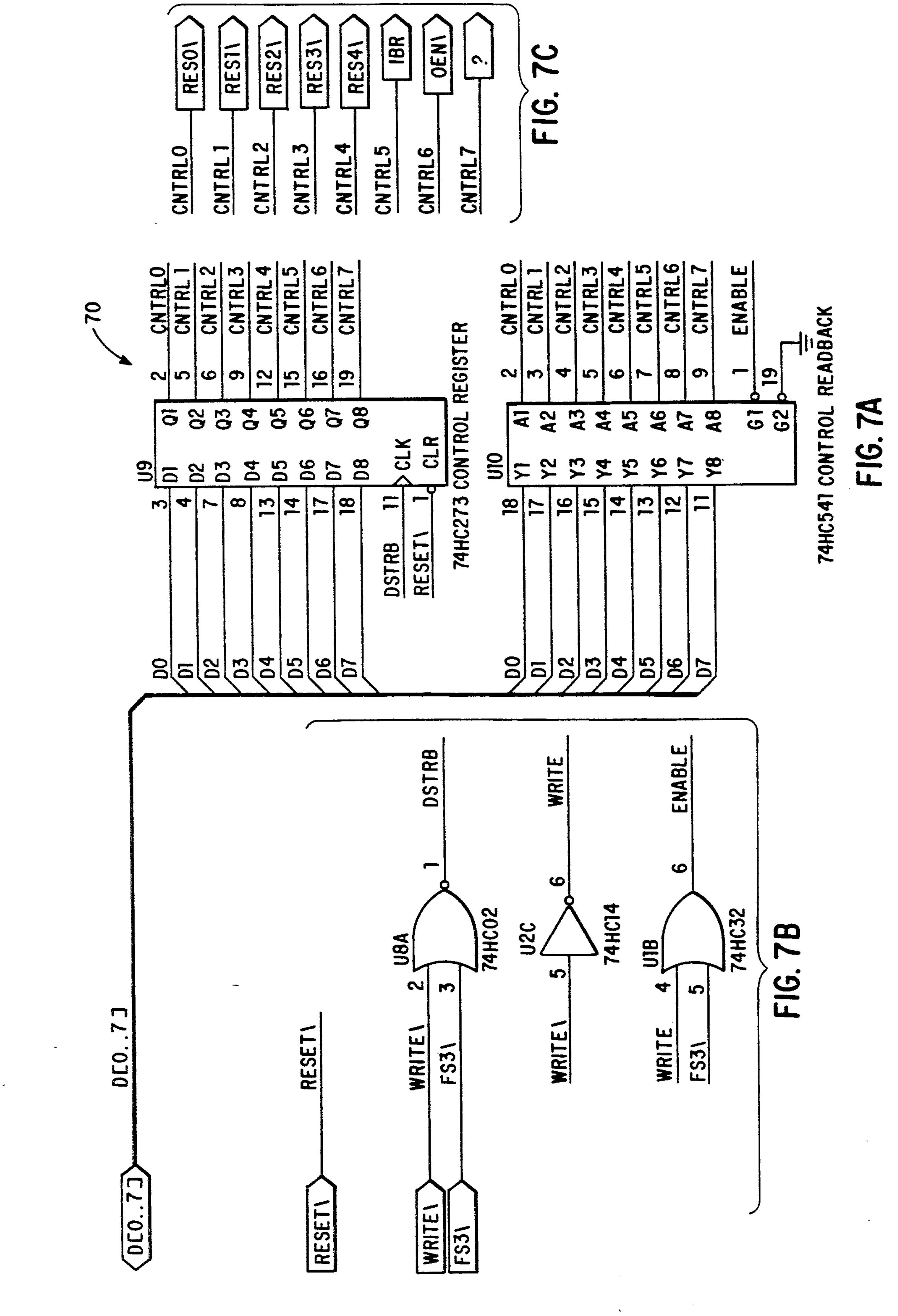
FIG. 7A-7C show elements of the reset-control unit of FIG. 2.

FIG. 7 shows a preferred control unit 70 including a control register U9 (SP# 74HC273) and an 8-bit read/write latch-with-clear at base address offset C0 (HEX). Interface unit output signal FS3 and VMEbus signal WRITE inputs together through NOR gate U8A (SP# 74HC02) produce a data strobe signal DSTRB to the CLK pin of control register U9, which latches command data signals D[0 . .7] from the VMEbus to provide control signals CNTRL[0 . .7] for other units of the module to function responsively.

Command signals written into control register U9 for output as control signals CNTRL[0 . .7] can be read back through connector Pl by line driver U10 (SP# 74HC541), which is enabled by the inverted WRITE signal.

A CNTRL0 signal value binary O written on line RES0 resets the (FIG. 8) input buffer 80 address counter U23; conversely, a signal value 1 on line RES0 allows counter U23 to increment addresses for the input buffer RAMs.

A CNTRLl signal value 0 written on line RESl resets (FIG. 15) signal generator 150 time-constant counters U36, U37, U40 and U41.

A CNTRL2 signal value 1 written on line RES2 resets the (FIG. 11) bus interrupt module control 110 (BIM) registers.

Control register U9 output signals CNIRL3 and CNTRL7 are not used.

Control register U9 output signal CNTRL4 on line RES4clears the (FIG. 12) status unit 120.

A CNTRL5 signal value 1 written on line IBR asserts the input buffer ready signal indicating whether the interface module 10 is ready to receive data signal inputs DIN[0 . .15] from an external UCDP.

A CNTRL6 signal value 1 written on line OEN enables the (FIG. 13) data output buffer 130 registers U30 and U31 to output data signals DOUT[0 . .15] to an external UCDP.

Figure 8A:
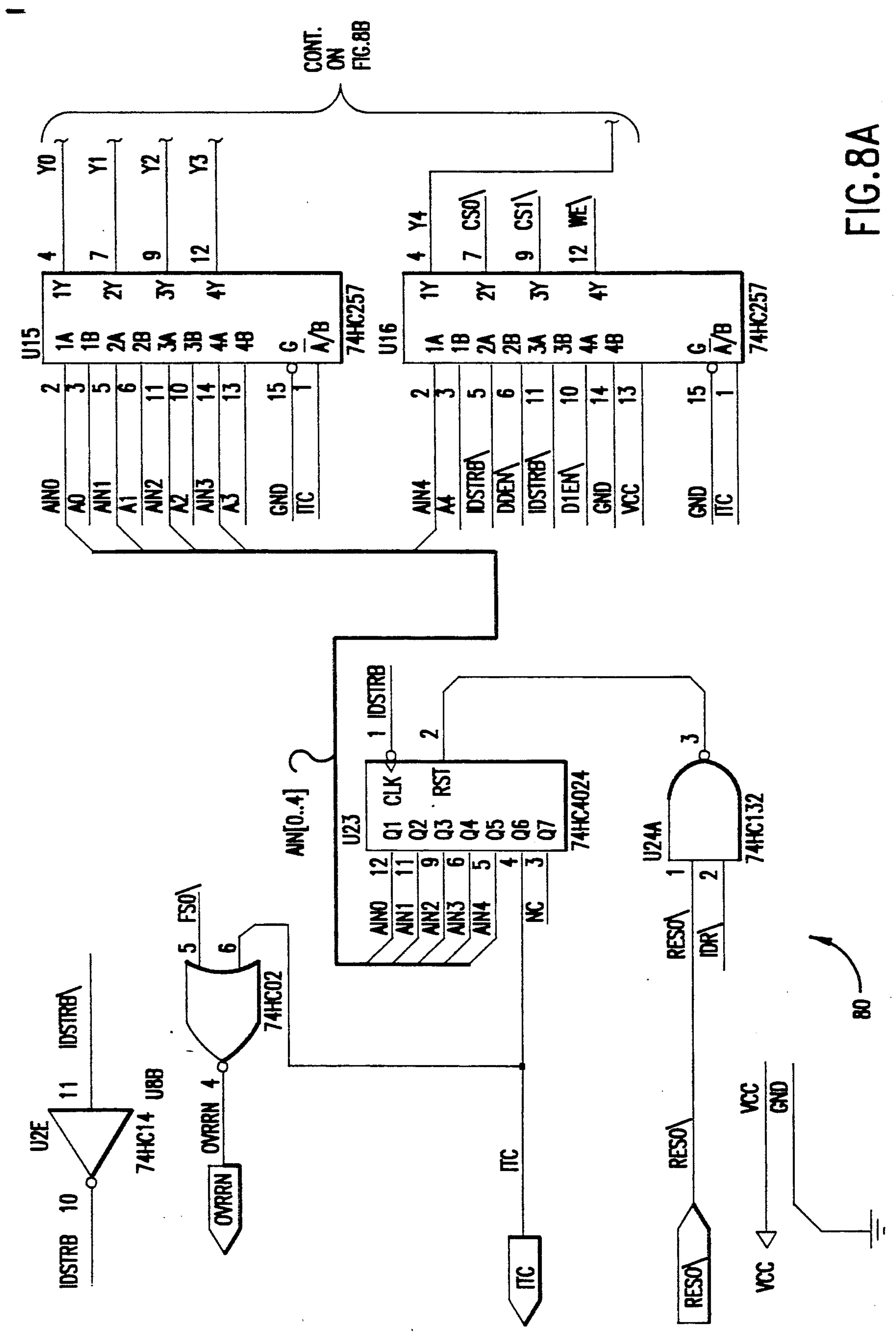
FIG. 8A-8D show elements of the input signal buffer unit of FIG. 2.
Figure 8B:
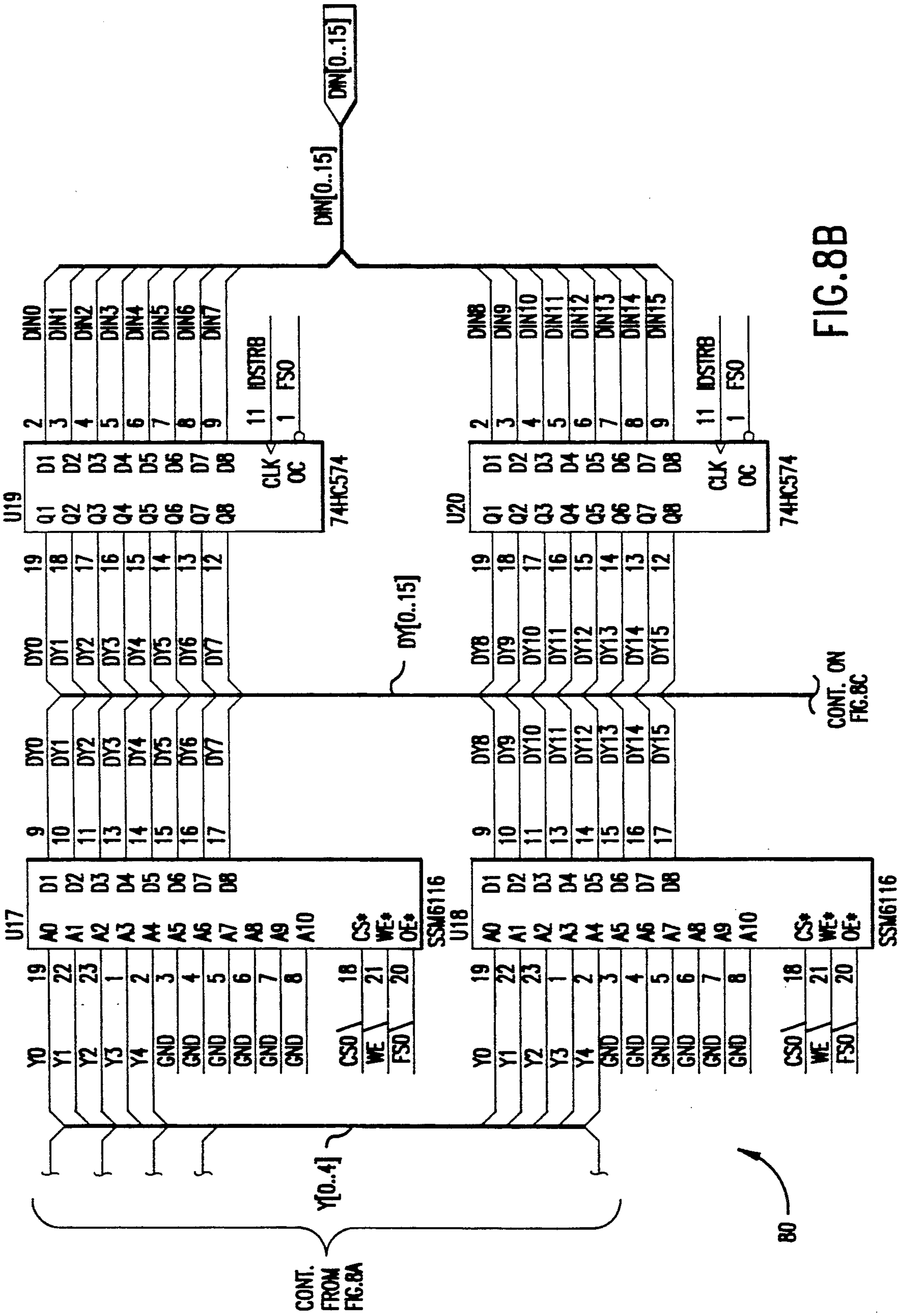
Figures 8C, 8D:
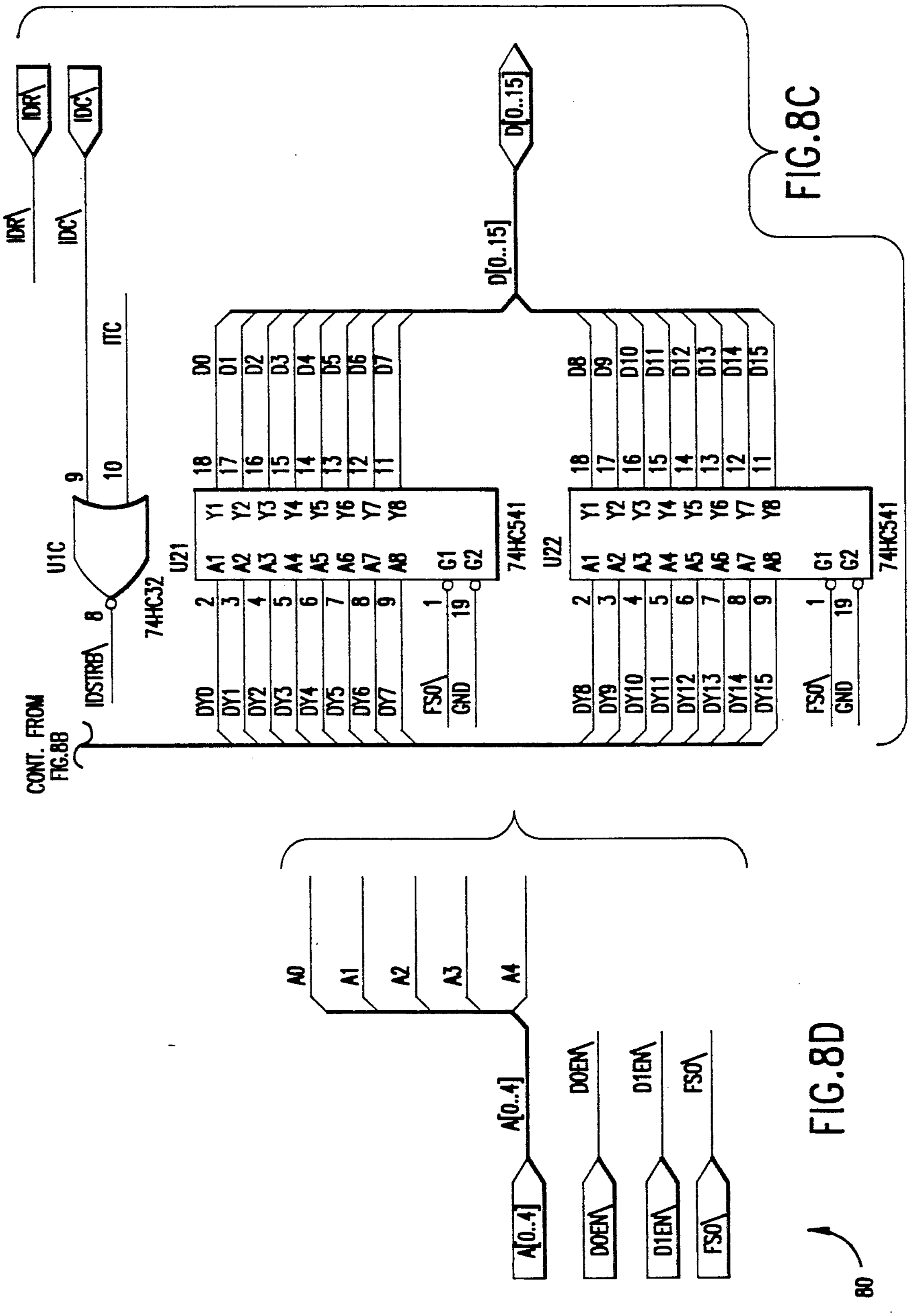
Figure 9:
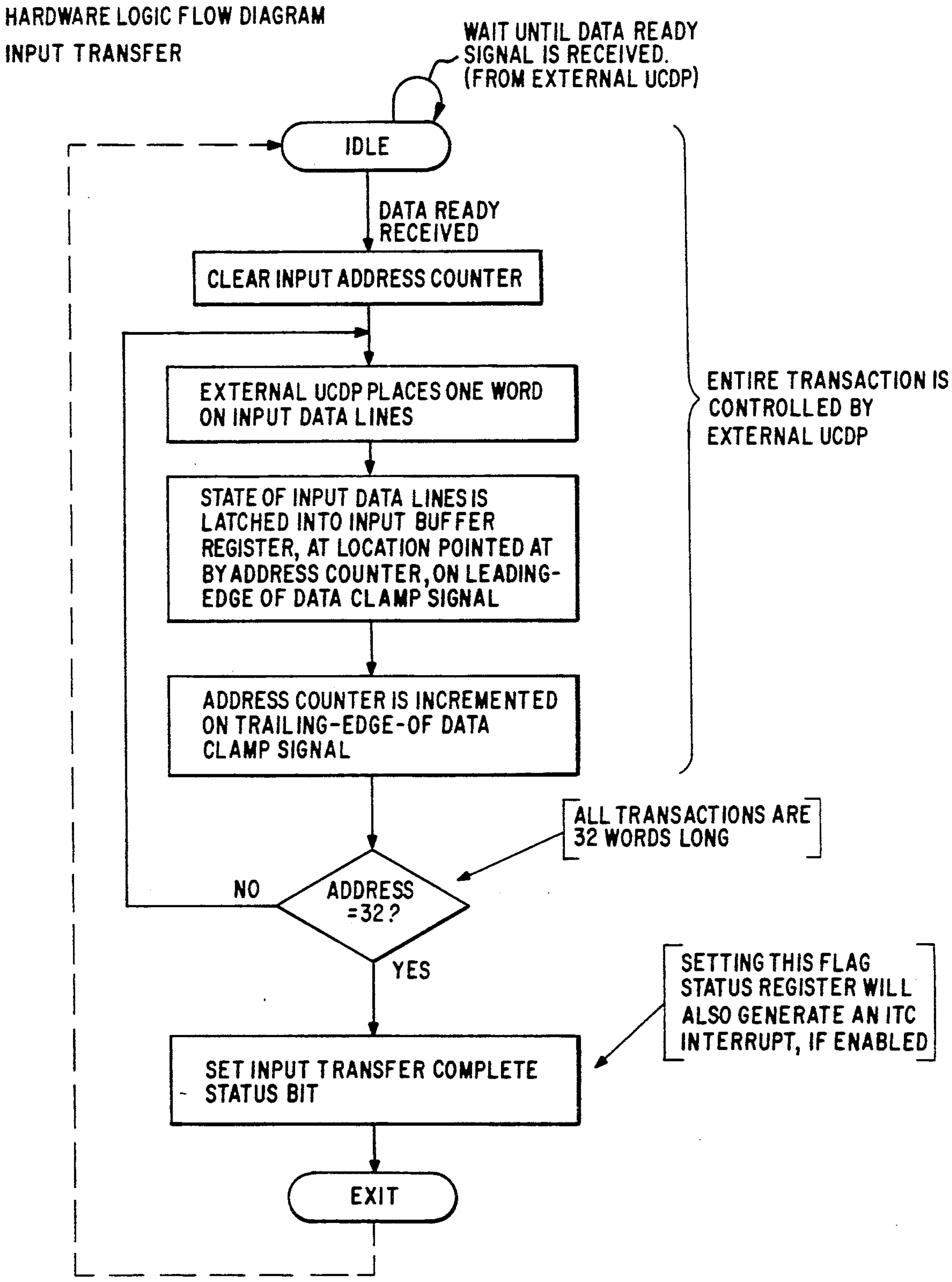
FIG. 9 is a logic flow diagram of functions in a cycle of the input buffer unit of FIG. 8.
Figure 11A:
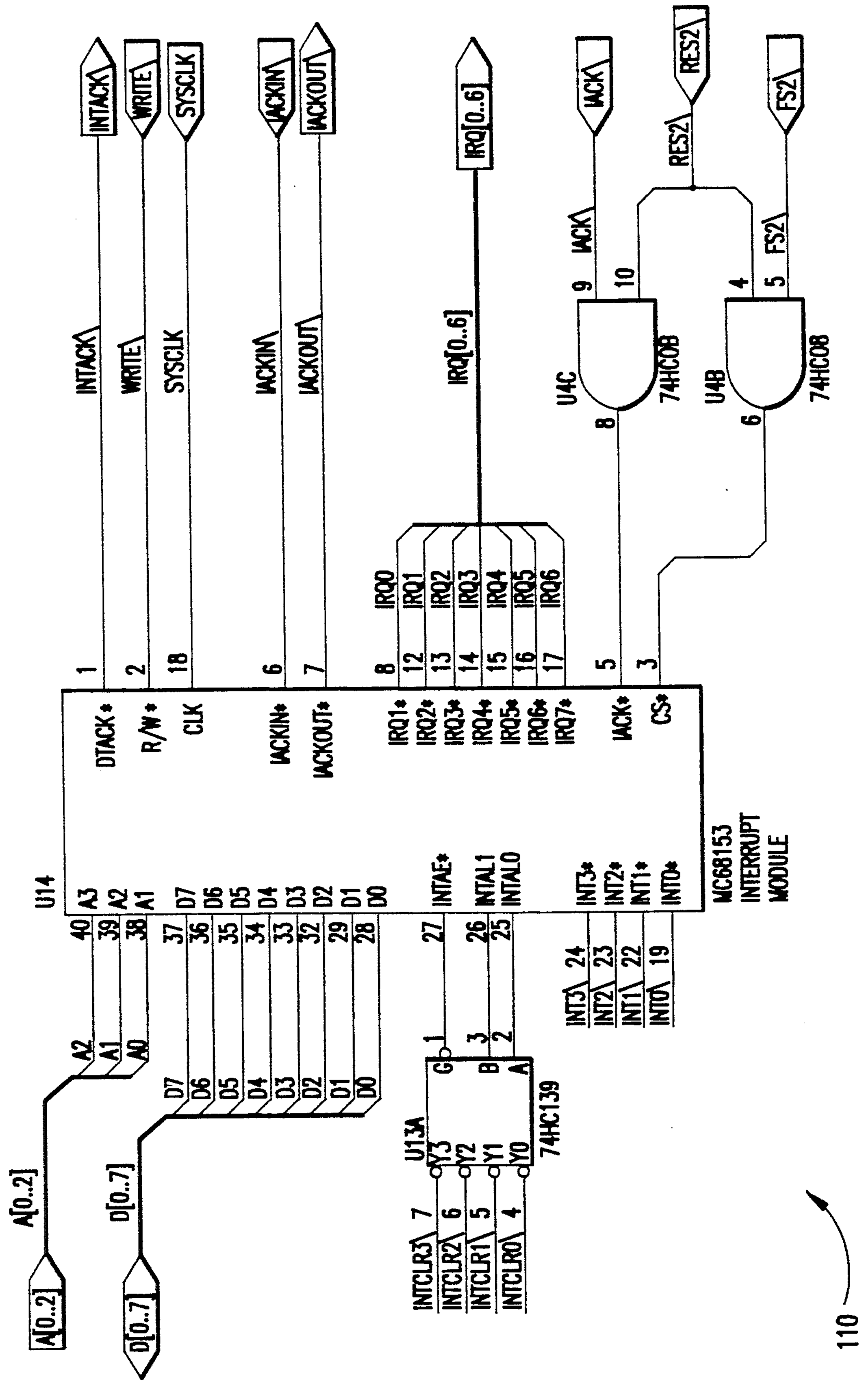
FIG. 11A-11F show elements in the interrupt control unit of FIG. 2.
Figure 11B:
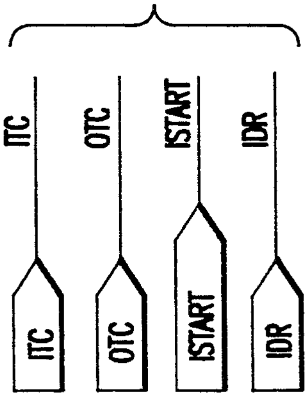
Figure 11C:
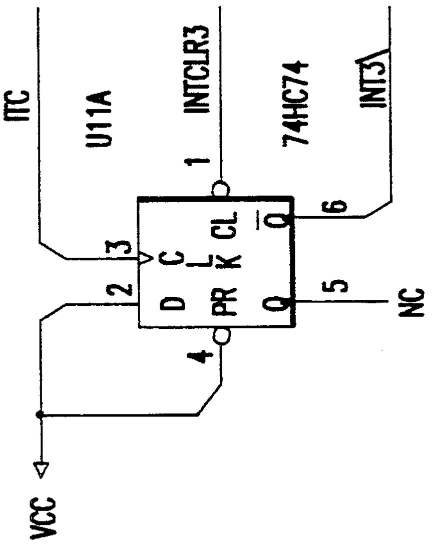
Figure 11D:
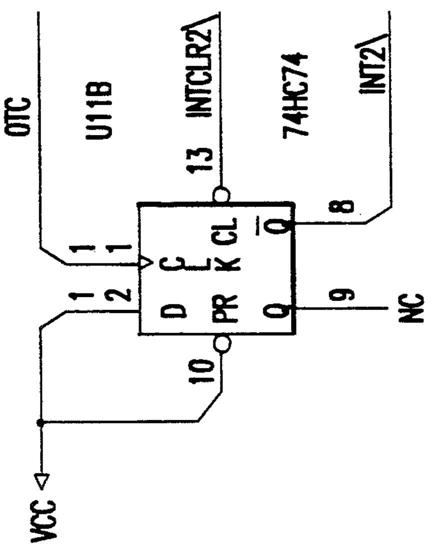
Figure 11E:
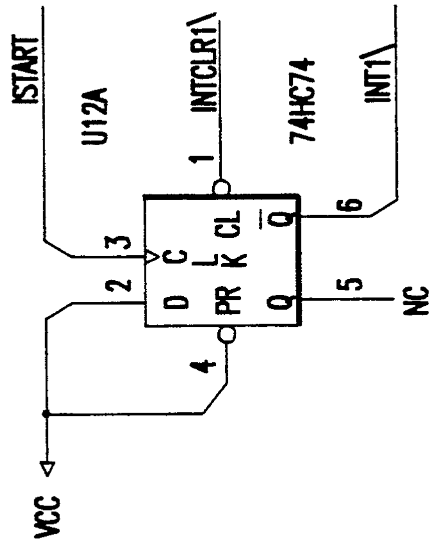
Figure 11F:
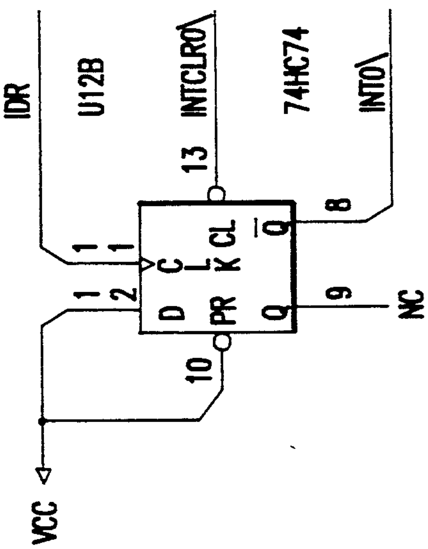
Figures 12A, 12B, 12C, 12D, 12E:
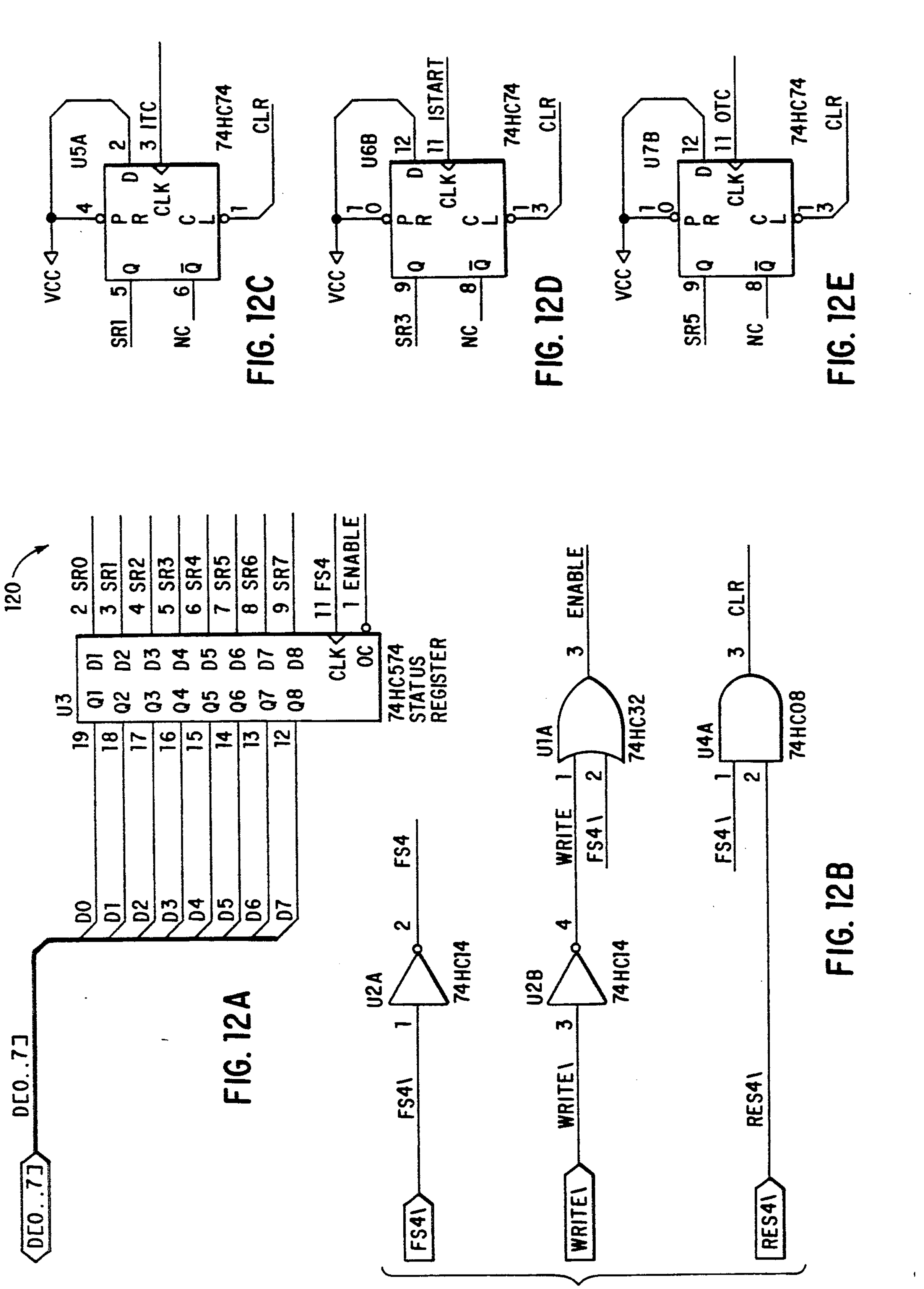
FIG. 12A-12I show gates and registers in the status unit of FIG. 2.
Figure 12F:
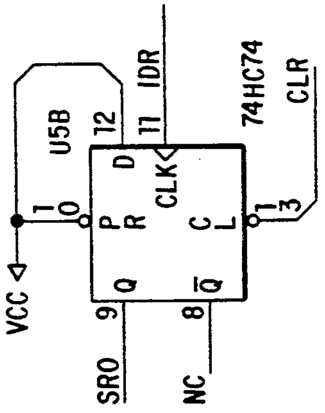
Figure 12G:
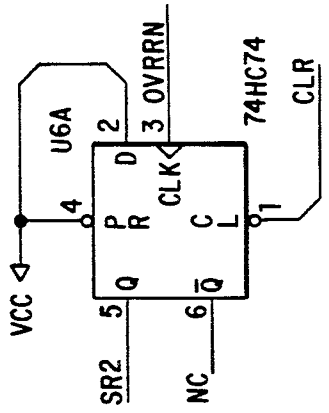
Figure 12H:
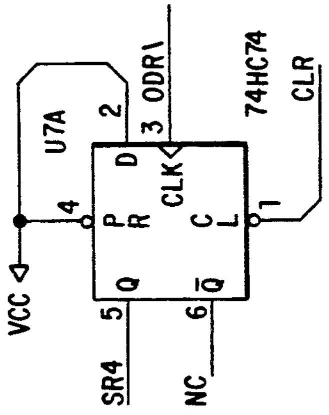
Figure 12I:
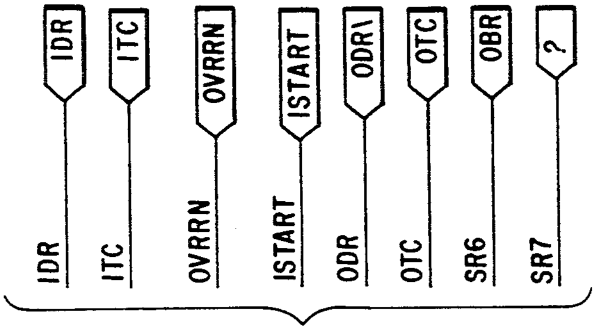

FIG. 8 shows the input data buffer unit 80 through which all data inputs from the UCDP are transferred in cycles as shown in FIG. 9. An external UCDP presents an input data ready signal IDR to indicate when the range system is ready with a message-block for input to the interface module 10. Signal IDR going low at the input to NAND gate U24A (SP# 74HC132) resets counter U23 (SP# 74HC4024), which in turn outputs a zero address AIN[0 . .4]. Hence, signal Y0–Y4 address value zero initiates the U17 and U28 static RAMs' (SP# SSM6116) lower-order 64 bytes to store the first complete 16-bit word of the input message block.

Subsequently, the UCDP transmits 32 consecutive data clamp signals IDC, during active states of which the input data signals are valid as shown in FIG. 10. Signal IDC falling edges applied to OR gate UlC (SP# 74HC32) cause inverter U2E (SP# 74HC14) output signals to strobe registers U19 and U20 (SP#74HC574), which latches data signals DIN[0..15] for storage in static RAMs U17 and U18. Rising edges of signals IDC cause signals IDSTRB to increment counter output U23 addresses, while the data is strobed into RAMs U17 and U18. Data word exchange rates may vary from 250 nanoseconds to 32 microseconds per data word transfer.

Once an entire message block has been received, at word number 32 counter U23 output pin Q6 goes high to provide an active input transfer complete signal ITC for an interrupt informing the VMEbus computer that the input data is then valid, and toggles the A/B inputs of multiplexers U15 and U16 (SP# 74HC257), which then select address signals A[0 . .4] allowing the VMEbus to read static RAMs U17 and U18. Registers U17 and U18 are dual-ported to be written in by the external UCDP and also read out (as 64 bytes of 8 bits each, or as 32 words of 16 bits each) by the local-host VME computer.

When the host VME computer detects a signal ITC indicating that a complete message-block input has become available for reading, the contents of RAMs U17 and U18 may be transferred through line drivers U21 and U22 (SP# 74HC541), out connector Pl to the VMEbus and into the memory of the local-host processor.

The VME host computer should not attempt reading the input buffer 80 while ITC has a 0 value, because this would set the overrun error bit OVRRN in the (FIG. 12) status register. If the VMEbus is reading the input buffer 80 RAM when another UCDP message arrives, which is generally unlikely, the latter message will be stored in the buffer RAMs, but the former message will not remain valid. In such a case, NOR gate U8B (SP# 74HC02) generates an overrun signal OVRRN which notifies the VME computer that the former message data is no longer valid. However, the newly arriving message data will not be lost, and may be read out later. If the OVRRN bit has already been set when the input buffer 80 contents have been read, it should be assumed that a new transfer was received, and the host VME computer should disregard the just-read message and instead wait for a new ITC signal. The VME processor preferably tests each ITC signal status and OVRRN signal status both before and after each UCDP input message.

FIG. 11 shows the module interrupt control unit 110, which in response to any of up to four different conditions, enables the interface module 10 to generate interrupts to the VME-CPU.

An input data ready signal IDR being received indicates that the range system is ready to provide an input message, and may also be used to capture time-tag information or to prepare the VME computer to read the input buffer.

An input transfer complete signal ITC being received indicates that an UCDP input data message has been received and is now available in the input buffer registers to be read by the VMEbus.

An external input start request signal ISTART being received indicates that an external UCDP is ready to receive an output data message transfer from this UCDP interface.

An output transfer complete signal OTC being received indicates completion of a previously-activated output transaction to a UCDP, and that it is safe for a new message to be written into the output buffer.

Any one or all four of these interrupt conditions may be latched into a respective flip-flop U11A, U11B, U12A or U12B (SP# 74HC74) and applied to controller U14 (SP# MC68153) to cause an interrupt request on the corresponding line IRQ[0. .6] through connector Pl to the VMEbus. -

Interrupts are controlled by a bus interrupt control unit 110 (FIG. 11), preferably using a Motorola MC68153 bus interrupter module (BIM) U14, which can provide individual control and vector registers for each of up to four interrupt sources.

Interrupt control registers are implemented inside BIM U14 with single-byte registers which are initiated with values for interrupt level, enable IRE, and interrupt acknowledge IRAC signals, each, at respective base address offsets 80, 82, 84 and 86 (HEX) as shown in the FIG. 6 register model.

Interrupt vectors are provided by single-byte vector registers at base address offsets 88, 8A, 8C and 8E (HEX) inside BIM U14 which store respective interrupt vector-values for each source of potential interrupts.

BIM U14 performs all necessary functions to inform the VMEbus when it needs to act on the module. BIM U14 has registers which are accessible by the VME-CPU to ascertain how interrupts should be handled.

Interface module 10 operation requires information including the statuses of signals IDRD, ITC, OVRRN, ISTART, output data ready ODR, and OTC, whose rising edges are detected by flip-flops U5A, U5B, U6B, U7A and U7B, as well as an output buffer ready signal OBR which is active low. FIG. 12 shows the status register unit 120 in which these signals are applied to status register U3 (at base address offset C2 HEX), a one-byte read-only register (SP# 74HC574) storing:

| Bit | Function |
|---|---|
| 0: | Input data ready bit IDR being set indicates that the input buffer 80 has also received an IDR signal from an external UCDP. The IDR bit being set before the input transfer complete ITC bit has been set indicates that a message is currently being received and that therefore the input buffer should not yet be read out. |
| 1: | Input transfer complete ITC being set indicates to the local VME computer that the input buffer 80 has received a complete message, which may now be read out. As long as bit ITC remains equal to zero, any attempted input buffer reads will set the OVRRN bit. |
| 2: | Input buffer overrun bit OVRRN being set indicates an error condition caused by the host VME computer either attempting to read the input buffer 80 before the ITC bit has been set, or continuing to read the input buffer after a new data ready signal arrives. |
| 3: | External start received bit ISTART being set indicates an external UCDP request to receive a transfer of data, but does not necessarily require a response from the local VME computer. |
| 4: | Output data ready bit ODR , which is set by the interface module issuing a data ready signal to another UCDP, may also be used by the local host VME processor to indicate that an output transaction is in progress. The ODR bit being set prior to the OTC bit being set indicates a currently executing output transaction. |
| 5: | Output transfer complete bit OTC is set to indicate the completion of an output message transfer to another UCDP. The local VME computer may use the OTC bit to determine when it can write a new message into the output buffer 130. |
| 6: | External device ready to receive bit OBR being reset indicates that a range system UCDP is waiting to receive a message block from the interface. |
| 7: | Not used. |

Status register U3 (while similar to control register U9) is readable only by the VMEbus. Reading register U3 clears all status bits except for OBR signal input SR6, which is not latched into status register U3.

Figure 13A:
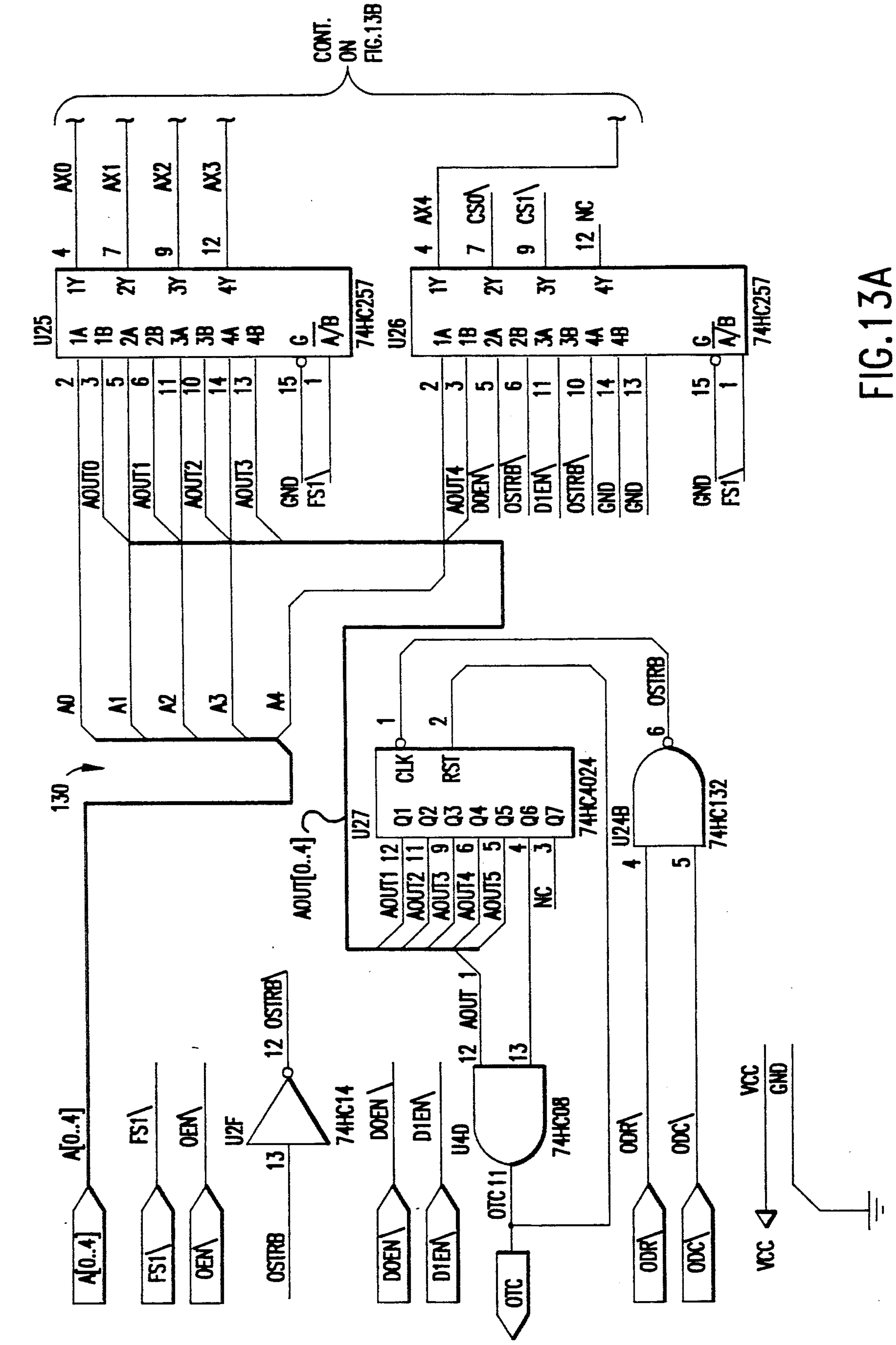
FIG. 13A-13C show address and storage elements of the output signal buffer unit of FIG. 2.
Figure 13B:
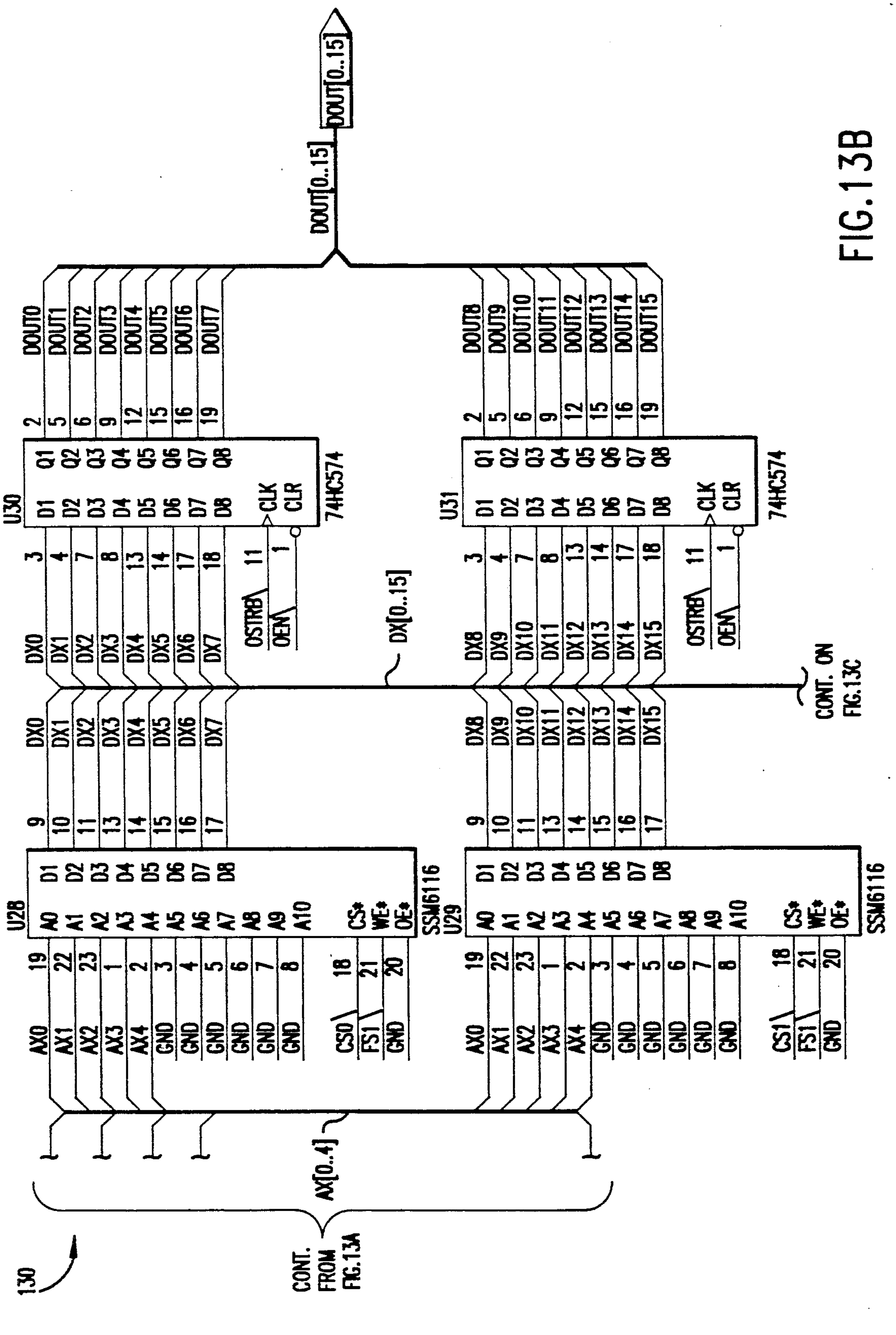
Figure 13C:
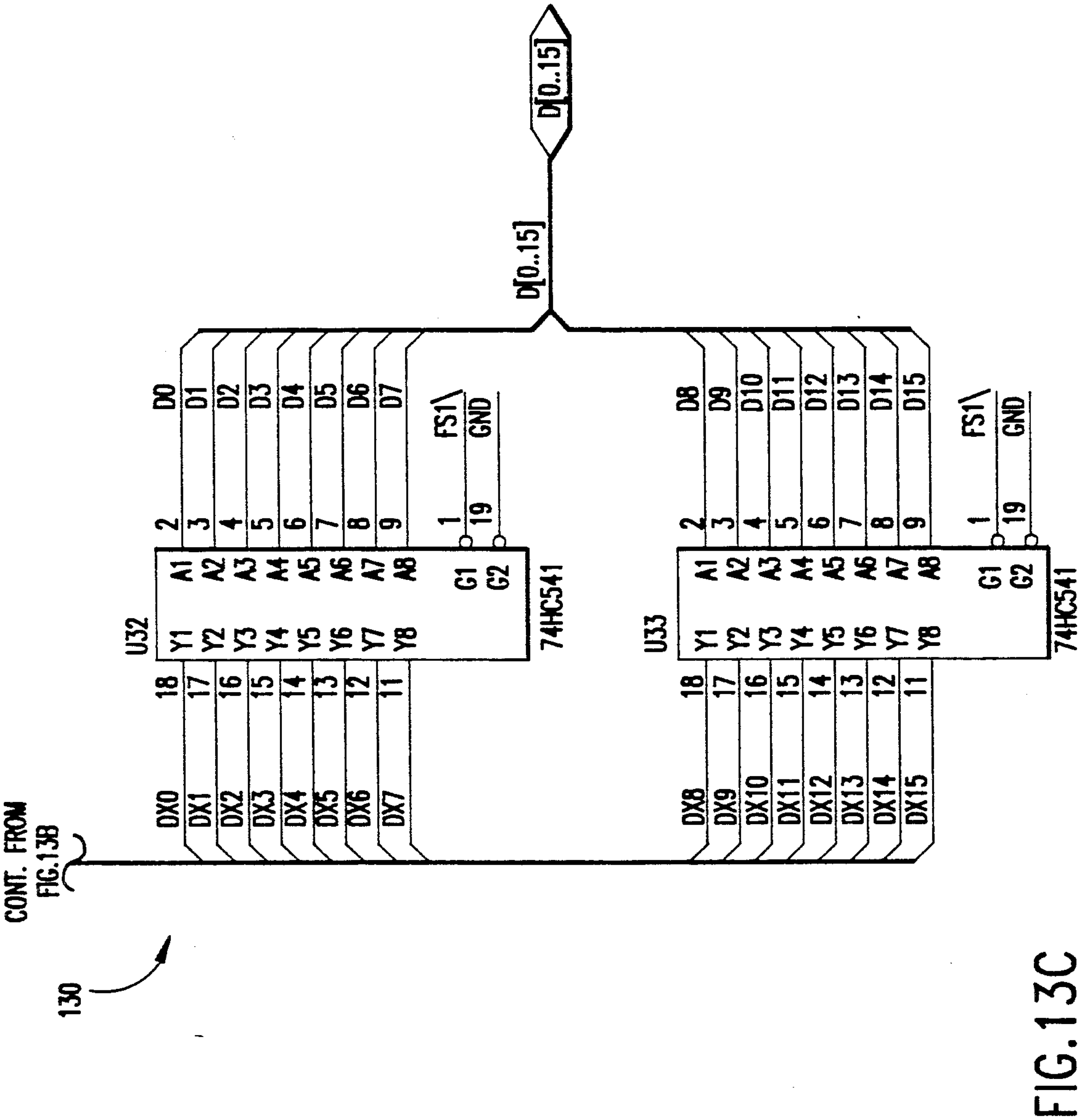
Figure 15A:
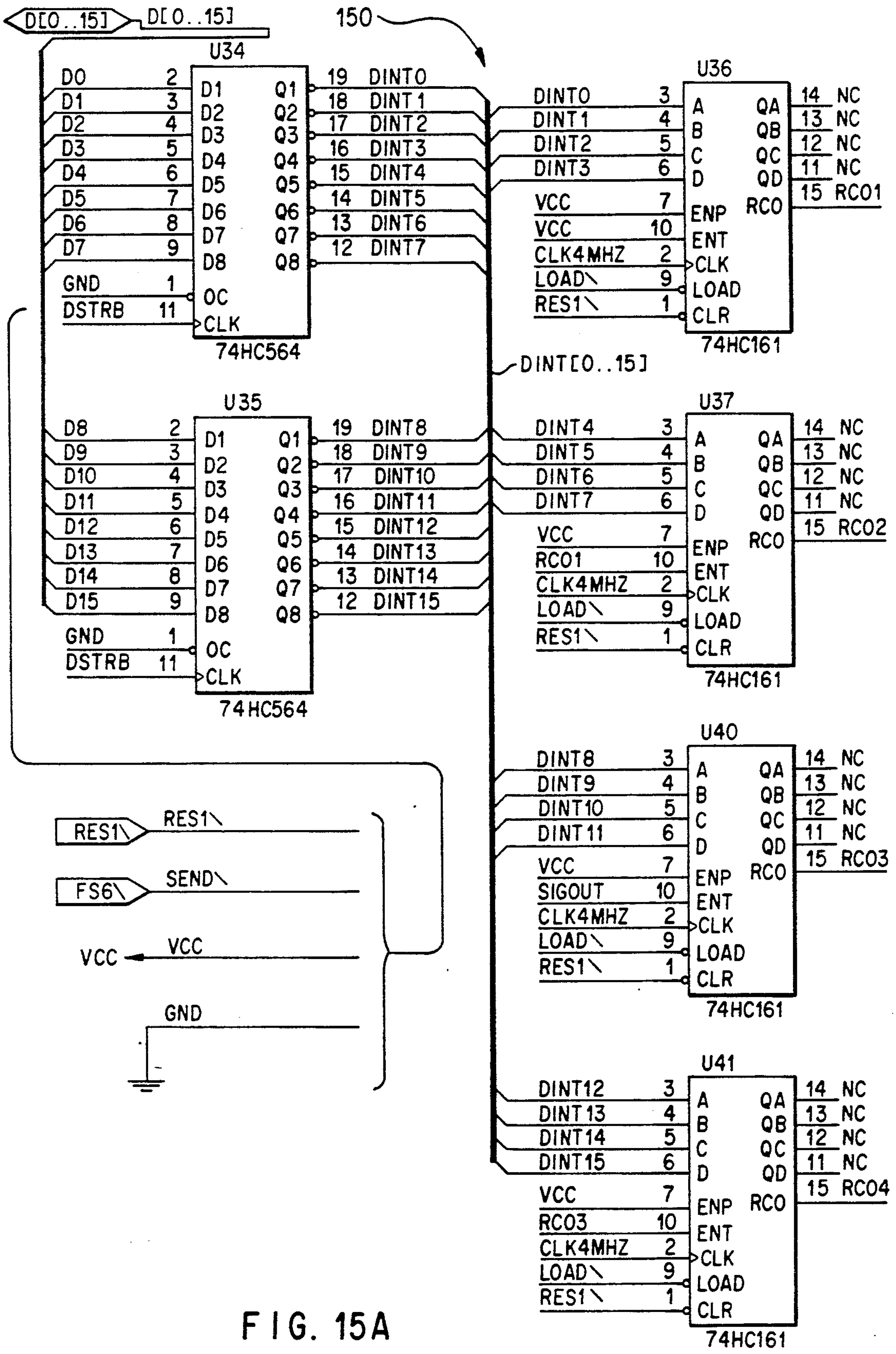
FIG. 15A-15J registers used in the signal generator unit of FIG. 2.
Figure 15B:
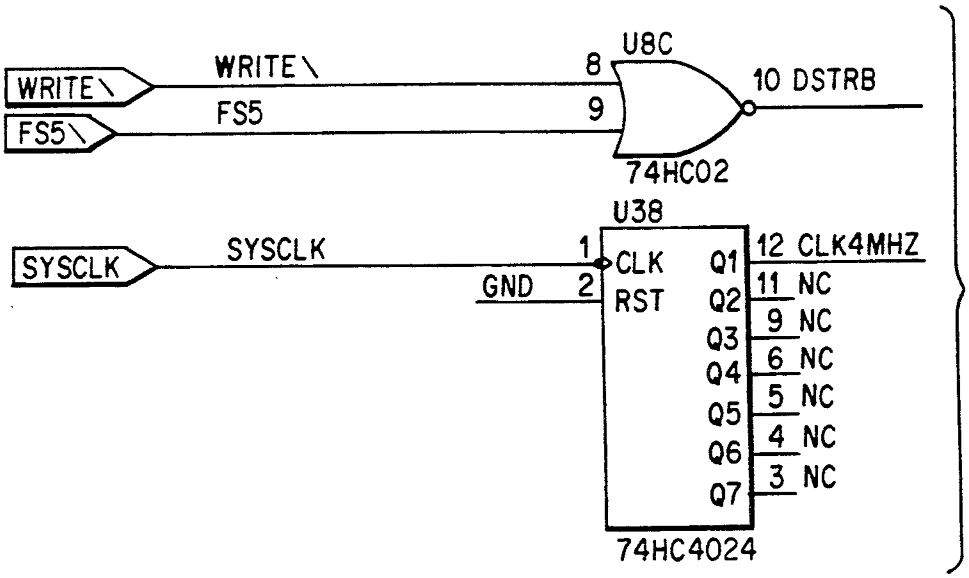
Figure 15C:
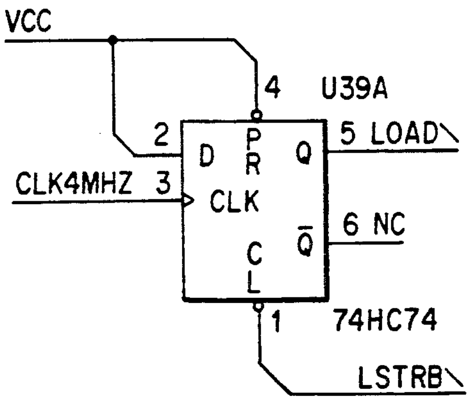
Figure 15D:
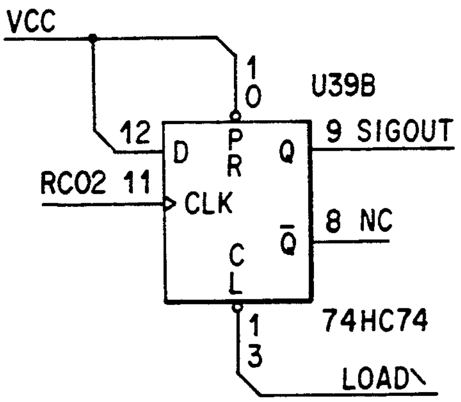
Figure 15E:
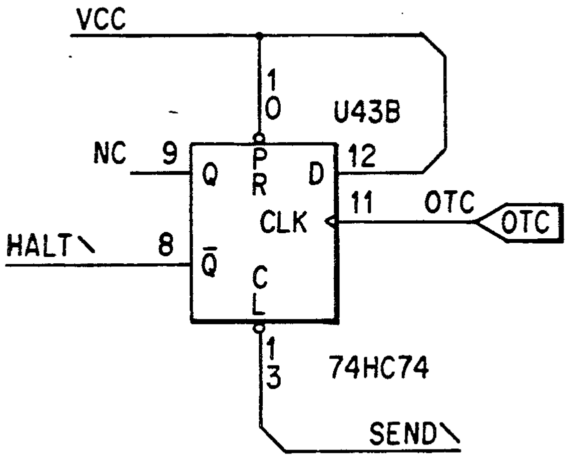
Figure 15F:
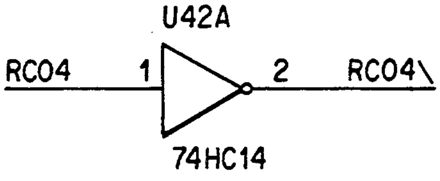
Figure 15G:
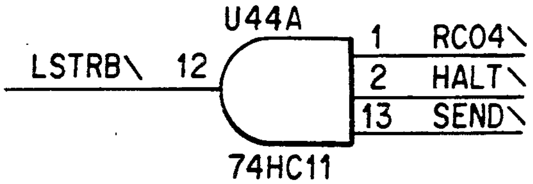
Figure 15H:
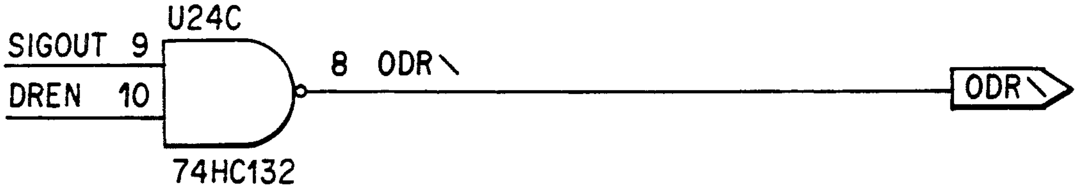
Figure 15I:
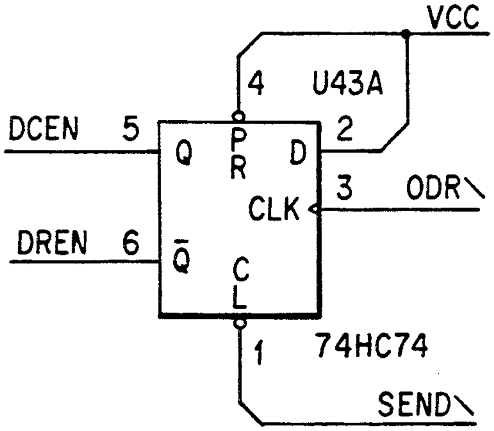
Figure 15J:
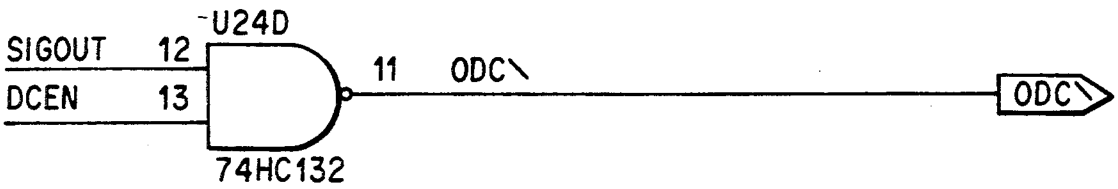
Figure 14:
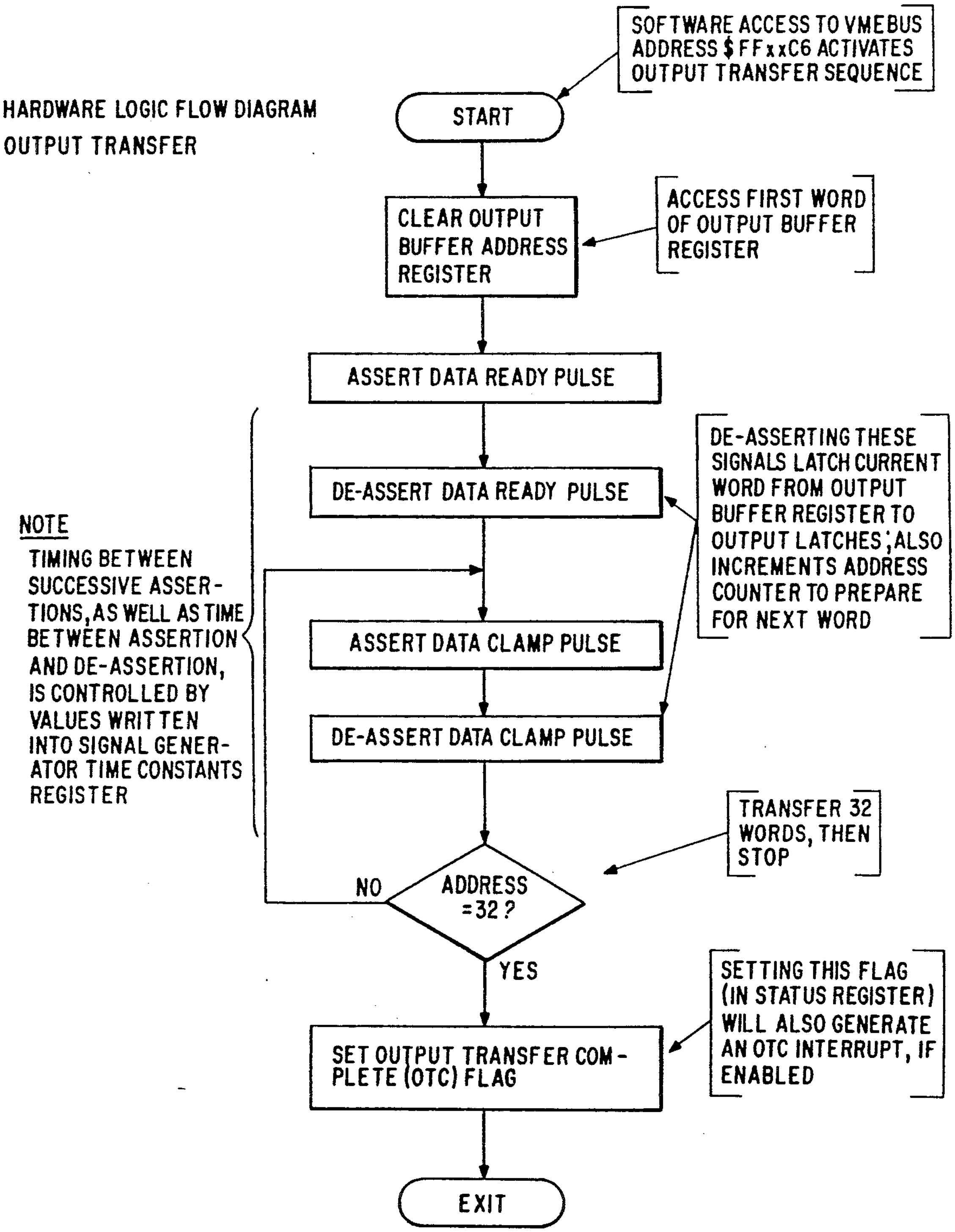
FIG. 14 is a logic flow diagram of functions in a cycle of the output buffer unit of FIG. 13.

FIG. 13 shows the output signal buffer unit 130, which resembles the FIG. 8 input buffer unit 80 and operates similarly in cycles as shown in FIG. 14. UCDP output data is transferred through the output buffer 130 under control of output data ready signal ODR and output data clamp signal ODC.

Once the host VME computer has sensed a TRUE output transfer complete signal OTC, it is enabled to dispatch a message to the output buffer 130 through line driver latches U32 and U33 (SP# 74HC541) at base address offset 40 (HEX), which are enabled by interface unit output signal FS1 to load VMEbus data signals D[0 . .15] into 2K×8-bit static RAMs U28 and U29 (SP# SSM6116). While FSl controls MUXes U25 and U26 (SP# 74HC257) to select addresses A[0 . .4], the VMEbus writes 32 words of a message block into the static RAMs which may be accessed as either 64 bytes of 8 bits each or as 32 words of 16 bits each.

Although the host VME computer is permitted to write data signals D[0 . .15] into the output buffer 130 whenever the signal OTC status is TRUE, it should not access the transmit activation register (C6 HEX) until it has sensed that the external device ready signal OBR is also TRUE.

Once this is done, the VME performs any word-access to the transmit activation register in interface unit decoder U48, which issues a SEND signal on line FS6 to inform the (FIG. 15) signal generator unit 150 that the output buffer unit 130 has been loaded with a message block to be transmitted to an external UCDP. In response, the signal generator 150 provides an output data ready signal ODR and sets the corresponding ODR bit in the status unit 120, which can be tested by the host VME computer to determine when an output transfer has begun. Then, the signal generator 150 generates output data clamp signals ODC.

Counter U27 (SP# 74HC4024), which is similar to input buffer address counter U23, is incremented by output data ready signals ODR and output data clamp signals ODC. Memory registers U30 and U31 (SP# 74HC574) are dual-ported, allowing them to be written into by lines DX[0 . .15] from the local VMEbus computer as well as read out by lines DOUT[0 . .15] to an external UCDP. Each data clamp signal ODC strobes a 16-bit data word DOUT[0 . .15] through registers L!30 and U31 and out connector P2 to the external UCDP. The output data is valid on the falling edges of each of the 32 ODC pulses.

When all 32 of the buffer address-locations have been transferred, AND gate U4D (SP# 74HC08) output transfer complete signal OTC goes high, which notifies the VME CPU that the message block transfer has been completed.

FIG. 15 shows the output signal generator unit 150, which receives a SEND signal on line FS6 from the transmit activation register at offset address C6 HEX in decoder U48, and uses write-only single-word registers U34 and U35 to store two 8-bit time-constant values, at base address offset C4 (HEX), and to generate the output data ready ODR and output data clamp ODC pulses. U34 and U35 (SP# 74HC564) are latches which are written with data values for timing the output pulses. U34 stores the upper 8 bits to time the width cf outputs for data ready ODR and data clamp ODC signals. U35 stores the lower 8 bits to time the periods between, i.e. duty cycles of, successive output pulses. Both time-constant values define intervals in ranges from 250 nanoseconds to 32 microseconds, in increments of 250 nanoseconds, between 0 and about 63 microseconds. For example, a time-constant value of 5180 (143C HEX) measures pulses 5 microseconds in duration with 15 microsecond periods, which coincides with the CDDI specifications of document RFC-100.

U36, U37, U40 and U41 (SP# 74HC161) are counters clocked by a 4 megahertz signal CLK4MHZ derived from SYSCLK. Flip-flops (SP# 74HC74) U39A, U39B, U43A, U43B, and gates U42A, U44A and U24C control ODR pulses, while flip-flops U39B and U43A and gate U24D control ODC pulses. The signal generator 150 generates one ODR pulse followed by 32 ODC pulses, which are output through the P2 connector and used by the UCDP to latch signals DOUT[0 . .15]. An output transfer complete signal OTC being received by flip-flop U43B halts pulse generation.

The input and output buffer contents are initially unknown and should be assumed to have any particular value. Either power-up or RESET re-initializes the interface module to a known state which disables and clears all module functions including interrupts, the input buffer, the output buffer and the signal generator, so that when the module is enabled there will be no pending interrupts. A preferred initialization sequence is as follows:

| Step | Action |
|---|---|
| 1. | If the module state is unknown, RESET the module by writing a VMEbus RESET signal 40 HEX into control register U9. Status register U3 should also be cleared of any previously set status bits. |
| 2. | Set the signal generator time constant registers U34 and U35. |
| 3. | Set the interrupt vector registers for each of the up to four interrupt sources used. |
| 4. | Set the interrupt control recister U14 levels for each of the interrupt sources used. Interrupts may be prioritized in any way but the following ranking is preferred: |

| Priority | Function |
|---|---|
| Highest | Input data ready (IDR) at 80 (HEX) |
| | Input transfer complete (ITC) at 84 (HEX) |
| | External start request/received (ISTART) at 82 (HEX) |
| Lowest | Output transfer complete (OTC) at 86 (HEX) |

5. Set the interrupt control register U14 bits:

| | |
|---|---|
| F bit 7 | "Don't Care" bit can be used with the MC680x0 test and set (TAS) instruction without distributing other bits in the interrupt control register. |
| FAC bit 6 | "Don't care" is used to tell the MC68153 to automatically clear the "F" bit during an interrupt-acknowledge cycle. |
| X/IN* bit 5 | should be set to zero to allow the BIM to respond to an interrupt acknowledge cycle with the previously loaded interrupt vector. |
| IRE bit 4 | being set to "1" enables the interrupt request. |
| IRAC bit 3 | "Don't care" if set, tells the MC68153 to clear the corresponding IRE bit in response to an interrupt acknowledge cycle. If used, each time this interrupt is acknowledged it must be re-enabled by the VME processor. The recommended setting is zero for this bit. |

6. Set Control register U9 to 27 HEX to assert IBR to an external UCDP, enable the BIM, input and output buffers, and the signal generator.

While the present invention has been described in terms of a preferred embodiment, it will be appreciated by those skilled in the art that this embodiment may be modified without departing from the essence of the invention. It is therefore intended that the following claims be interpreted as covering any modifications falling within the true spirit and scope of the invention.

We claim:

1. An interface module (10) for exchanging electronic signals between a bus interface (VMEbus) (30) and an external channel (40), comprising:

interface means (50) responsive to VMEbus address signals and operative to activate a plurality of SELECT signals;

input buffer means (80) enabled by a particular one of said SELECT signals and incremented by input data channel ready (IDR) and input data clamp (IDC) signals to store parallel bits of data-words received sequentially from said channel, and then to activate an input transfer complete (ITC) signal from indicating an input transfer complete condition, and then responsive to VMEbus address signals to transfer stored data-words to said VMEbus;

interrupt control means (110) responsive to another one of said SELECT signals and to signals indicating module and channel conditions to activate appropriate interrupt signals to said VMEbus;

output buffer means (130) responsive to still another one of said SELECT signals and to VMEbus address signals to store parallel-bit data-words from said VMEbus, and then responsive to module output data ready (ODR) and output data clamp (ODC) signals to transfer stored data-words sequentially to said channel, and then to activate an OTC signal for indicating an output transfer complete condition; and timing signal generator means (150) responsive to an external channel output buffer ready (OBR) signal input to said interface means (50) and operative to generate a SEND signal to activate module ready ODR and clamp ODC signal lines for timing data-word transmissions by said output buffer means and receptions by said external channel.

2. An interface module as recited in claim 1 wherein: said timing signal generator means (150) is enabled by selected signal generator (SGEN) and WRITE signals to latch time-constant signal values from said VMEbus, is reset to begin counting said values, and is incremented by VMEbus clock signals to activate said ODR and ODC signal lines during period and duty-cycle intervals in proportion to said time-constants.

3. An interface module as recited in claim 1 wherein: VMEbus addresses are decoded in a range of offsets from a base address which is selectable in said interface means (50).

4. An interface module as recited in claim 3 and further comprising:

control-reset means (70) which is cleared by a VMEbus RESET signal and is enabled by respective SELECT and VMEbus WRITE signals to latch VMEbus data signals for activating control-reset signal lines, and enabled to feed back said control-rest signals to said VMEbus; and status means (120) which is enabled by a respective SELECT signal and by said WRITE signal to latch signals indicating module and channel conditions.

5. An interface module as recited in claim 3 wherein: VMEbus control signals (DS0, DS1) strobe said interface means (50) to activate odd or even byte-enable signals (DOEN, D1EN) in response to which odd- or even-numbered bytes of data-words are either read from said channel or written to said VMEbus by said input buffer means (80), depending upon said ITC signal, and either read from sid_VMEbus or written to said channel by said output buffer means (130), depending upon said respective SELECT signal.

6. A module (10) for a VMEbus (30) interface to an external channel (40), said module comprising: input buffer means (80) including an address counter (U23) responsive to an input transfer complete condition to activate an input transfer complete (ITC) signal line, and responsive to module RESET or channel input data ready (IDR) signals to clear the ITC and address signal output lines of the counter;

an address multiplexer (U15, U16) switched by a cleared ITC signal to select buffer address signal lines form said counter;

a memory (U17, U18) addressed by signal lines selected by said multiplexer;

a receive register (U19, U20) for receiving parallel 16-bit data-words from said channel;

wherein channel input data clamp (IDC) signals synchronously strobe si register (U19, U20), said multiplexer (U15, U16) and said counter (U23) and in response, in each IDC signal cycle, simultaneously a channel data-word is latched n by said receive register, the previously-latched data-word is read sequentially into said memory, and said address counter is incremented to repeat the cycle until reaching a specified total message word number and thereby reactivating the ITC signal output line, which switches said multiplexer to select buffer address signal lines from said VMEbus; and a transmit register (U21, U22) through which, as a result of VMEbus signals addressing said memory, stored data-words are transferred to data lines of said VMEbus, unless said buffer means (80) is concurrently read and written, which activates an overrun (OVRRN) error signal.

7. A module (10) as recited in claim 6 and further comprising: output buffer means (130) including an output buffer address counter (U27) responsive to an output transfer complete condition to activate an output transfer complete (OTC) signal line which clears the counter address signal output lines and indicates to the VMEbus that the output buffer means maybe written by the VMEbus which, once interrupted by an OTC signal, activates a module select signal (FS1);

an output buffer address multiplexer (U25, U26) switched by said module select signal (FS1) to select output buffer address signal lines form said VMEbus;

an output buffer memory (U28, U29) addressed by signal lines selected by said output multiplexer;

an output buffer receive register (U32, U33) for receiving parallel 16-bit data-words from said VMEbus, through which, as a result of VMEbus signals addresses, said output memory (U28, U29) is written by said VMEbus which then activates said module select signal (FS1) to switch said output multiplexer to select output buffer address signal lines from said output counter (U27); and an output buffer transmit register (U30, U31) for transmitting stored data-words to said channel;

wherein, a channel ready signal OBR input to said module causing a SEND signal provides module data ready ODR and clam ODC signals to synchronously strobe said counter (U27), register (U30, U31) and multiplexer (U25, U26) and in response, in each ODC signal cycle, simultaneously said channel is written with a data-word from said output transmit register, said output transmit register (U30, U31) reads a stored data-word sequentially from said output memory, and said output buffer address counter is incremented to repeat the cycle until reaching the specified total message word number and thereby reactivating the OTC signal output line.

* * * * *